United States Patent
Ying et al.

(10) Patent No.: US 10,291,696 B2
(45) Date of Patent: May 14, 2019

(54) PEER-TO-PEER ARCHITECTURE FOR PROCESSING BIG DATA

(71) Applicant: ARIZONA BOARD OF REGENTS ON BEHALF OF ARIZONA STATE UNIVERSITY, Tempe, AZ (US)

(72) Inventors: Lei Ying, Tempe, AZ (US); Weina Wang, Tempe, AZ (US); Matthew Barnard, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 611 days.

(21) Appl. No.: 14/698,672

(22) Filed: Apr. 28, 2015

(65) Prior Publication Data

US 2015/0312335 A1    Oct. 29, 2015

Related U.S. Application Data

(60) Provisional application No. 61/985,320, filed on Apr. 28, 2014.

(51) Int. Cl.
| | | |
|---|---|---|
| G06F 15/16 | (2006.01) | |
| H04L 29/08 | (2006.01) | |
| G06F 9/50 | (2006.01) | |

(52) U.S. Cl.
CPC ........ *H04L 67/1061* (2013.01); *G06F 9/5066* (2013.01); *H04L 67/104* (2013.01);
(Continued)

(58) Field of Classification Search
CPC ............... H04L 67/104; H04L 67/1065; H04L 67/1061; H04L 29/08306; H04L 45/04;
(Continued)

(56) References Cited

U.S. PATENT DOCUMENTS

| | | |
|---|---|---|
| 4,924,384 A | 5/1990 | Hao et al. |
| 5,729,682 A | 3/1998 | Marquis et al. |

(Continued)

FOREIGN PATENT DOCUMENTS

| | | |
|---|---|---|
| EP | 1229442 | 1/2002 |
| EP | 2127295 | 12/2007 |

(Continued)

OTHER PUBLICATIONS

P. Maymounkov et al., "Kademlia: A peer-to-peer information system based on the XOR metric", Revised Papers from the First International Workshop on Peer-to-Peer Systems, IPTPS, London, UK, pp. 53-65 (2002).

(Continued)

*Primary Examiner* — Dustin Nguyen
*Assistant Examiner* — Hao H Nguyen
(74) *Attorney, Agent, or Firm* — Polsinelli PC

(57) ABSTRACT

A system is disclosed for managing large datasets. The system comprises a physical network. The physical network comprises a plurality of computing devices with a plurality of processors. The system further comprises a logical peer-to-peer (P2P) network with a plurality of nodes. The system further comprises a distributed file system for distributing data and jobs received by the system randomly across the plurality of nodes in the P2P network. The system duplicates the data to neighboring nodes of the plurality of nodes. The nodes monitor each other to reduce loss of data. The system further comprises a task scheduler. The task scheduler balances load across the plurality of nodes as tasks, derived from jobs, are distributed to various nodes. The task scheduler redistributes and forwards tasks to ensure the nodes processing the tasks are best suited to process those tasks.

16 Claims, 24 Drawing Sheets

(52) U.S. Cl.
CPC ...... *H04L 67/1065* (2013.01); *H04L 67/1076* (2013.01); *H04L 67/34* (2013.01)

(58) Field of Classification Search
CPC ... H04L 45/70; H04L 67/1095; G06F 9/5066; G06F 11/2094; G06F 17/30194
USPC ........ 709/201, 202, 203, 204, 220; 707/827; 710/29, 314; 714/4.11, 6.2, 6.32
See application file for complete search history.

(56) References Cited

U.S. PATENT DOCUMENTS

| | | | |
|---|---|---|---|
| 7,127,613 B2 | 10/2006 | Pabla et al. | |
| 7,236,939 B2 | 6/2007 | Chen et al. | |
| 7,301,944 B1 | 11/2007 | Redmond | |
| 7,401,153 B2 | 7/2008 | Traversat et al. | |
| 7,650,311 B2 | 1/2010 | Dean et al. | |
| 7,756,919 B1* | 7/2010 | Dean | G06F 17/30445 709/201 |
| 7,886,086 B2* | 2/2011 | Sharma | G06F 9/5077 710/29 |
| 8,176,189 B2 | 5/2012 | Traversat et al. | |
| 8,385,201 B2 | 2/2013 | Cohen et al. | |
| 8,510,267 B2 | 8/2013 | Barton et al. | |
| 8,522,073 B2* | 8/2013 | Cohen | G06F 11/1662 714/4.11 |
| 2003/0002521 A1 | 1/2003 | Traversat et al. | |
| 2003/0105831 A1 | 6/2003 | O'Kane | |
| 2004/0098447 A1* | 5/2004 | Verbeke | G06F 9/5055 709/201 |
| 2005/0114448 A1* | 5/2005 | Skomra | H04L 67/16 709/204 |
| 2008/0196087 A1* | 8/2008 | Ranjit | G06F 9/5072 726/5 |
| 2008/0313317 A1 | 12/2008 | Berger | |
| 2010/0061385 A1* | 3/2010 | Welin | H04L 29/12028 370/401 |
| 2010/0211789 A1 | 8/2010 | Dolganow et al. | |
| 2012/0060143 A1 | 3/2012 | Nigul | |
| 2012/0087253 A1 | 4/2012 | Patil et al. | |
| 2012/0221640 A1 | 8/2012 | Cohen | |
| 2012/0221647 A1* | 8/2012 | Ciminiera | H04L 67/104 709/204 |
| 2013/0066969 A1* | 3/2013 | Cohen | H04L 67/104 709/204 |
| 2013/0337836 A1 | 12/2013 | Johnson | |
| 2014/0164452 A1* | 6/2014 | Ying | G06F 17/30194 707/827 |
| 2015/0067004 A1* | 3/2015 | Shvachko | G06F 17/30194 707/827 |

FOREIGN PATENT DOCUMENTS

| | | |
|---|---|---|
| WO | 02/42922 | 5/2002 |
| WO | 2006/010703 | 2/2006 |
| WO | 2012/003623 | 1/2012 |
| WO | 2012/047927 | 4/2012 |

OTHER PUBLICATIONS

P. J. Leach et al., "A universally unique Identifier (UUID) URN namespace", RFC 4122, pp. 1-32 (2005).
J. Dean et al., "Communications of the ACM", vol. 51, Issue 1, pp. 107-113 (2008).
T. White, "The writable interface," in Hadoop: The Definitive Guide, O'Reilly Media, Inc. (May 2012).
Y. Ganjisaffar et al., "Distributed tuning of machine learning algorithms using MapReduce clusters", Proceedings of the Third Workshop on Large Scale Data Mining: Theory and Applications, San Diego, CA, pp. 2:1-2:8 (2011).
S. Ghemawat et al., "The Google File System", Proceedings of the nineteenth ACM symposium on Operating systems principles, SOSP, New York, pp. 29-43 (2003).
A. Ghoting et al., "SystemML: Declarative Machine Learning on MapReduce", IEEE 27th International Conference on Data Engineering (ICDE), Hannover, Germany, pp. 231-242 (2011).
M. Isard et al., "Quincy: Fair Scheduling for Distributed Computing Clusters", Proceedings of the ACM symposium on Operating systems principles, SOSP, Big Sky, MT, pp. 261-276 (2009).
H. Lin et al., "MOON: MapReduce on opportunistic environments", Proceedings of the nineteenth ACM symposium on High Performance Distributed Computing, HPDC, Chicago, IL, pp. 95-106 (2010).
F. Marozzo et al., "P2P-MapReduce: Parallel data processing in dynamic Cloud environments", Journal of Computer and System Sciences, vol. 78, Issue 5, pp. 1382-1402 (2012).
A. McKenna et al., "The Genome Analysis Toolkit: A MapReduce framework for analyzing next-generation DNA sequencing data", Genome Research, vol. 20, Issue 9, pp. 1297-1303 (2010).
K. Shvachko et al., "The Hadoop Distributed File System", IEEE 26th Symposium on Mass Storage Systems and Technologies, MSST, Incline Village, NV, pp. 1-10 (2010).
S. N. Srirama et al. "Adapting scientific computing problems to clouds using MapReduce", Future Generation Computer Systems, vol. 28, Issue 1, pp. 184-192 (2012).
L. Tassiulas et al., "Stability properties of constrained queueing systems and scheduling policies for maximum throughput in multihop radio networks", IEEE Transactions on Automatic Control, vol. 37, Issue 12, pp. 1936-1948 (1992).
R. Vernica et al., "Efficient Parallel Set-Similarity Joins Using MapReduce", Proceedings of the 2010 ACM SIGMOD International Conference on Management of data, SIGMOD, New York, pp. 495-506 (2010).
W. Wang et al., "Map task scheduling in MapReduce with data locality: Throughput and heavy-traffic optimality", IEEE International Conference of Computer Communications, INFOCOM, Turin, Italy, pp. 1609-1617 (2013).

\* cited by examiner

PEER-TO-PEER ARCHITECTURE FOR PROCESSING BIG DATA

CROSS REFERENCE TO RELATED APPLICATIONS

This application claims the benefit of U.S. Provisional Application No. 60/985,320 filed Apr. 28, 2014 and is herein incorporated by reference in its entirety.

STATEMENT REGARDING FEDERALLY SPONSORED RESEARCH AND DEVELOPMENT

This invention as made with Government support under Grant Numbers 1255425, 1261429 and 1264012 awarded by the National Science Foundation. The Government has certain rights in the invention.

FIELD

This document relates to distributed computing, and in particular, to storing and processing data across multiple computing devices within a distributed computing architecture and/or distributed computing network.

BACKGROUND

In recent years, the production of digital data has increased exponentially as more and more information is digitized; e.g., electronic devices capture data from an increasing number of sources such as smart phones, electronic sensors, and social media. "Big data" is a coined term that refers to large and complex volumes of data and the various analytics and methods used to process such data.

Information Technology (IT) and data storage environments that generate and receive growing volumes of big data seek efficient ways to manage, process, and analyze the data as it becomes available. Conventional systems and networks deploy various parallel processing tools to address big data analysis. Such systems require centralized job schedulers and/or resource allocators to manage and maintain the data. Stated differently, such systems often centralize authority to a few nodes within the network by using a master/slave architecture to coordinate allocation of resources. However, the master nodes within a master/slave architecture are burdened with and responsible for multiple roles which results in performance bottlenecks and increased reliability risk. Failure of one or more of the master nodes increases load on remaining nodes, potentially causing degradation or interruption of service in data storage and accession, new task delegation, and progress reporting. Conventional centralized systems are also susceptible to service disruptions in the event of lost slave machines which store metadata describing the locations of other data. Further, a drawback of master/slave (and broadly, hierarchical) architectures is that well-distributed data is dependent on decreasingly distributed resources at higher hierarchal levels.

The aforementioned conventional systems, with highly central control imposed by the master/slave architecture, present a variety of additional issues. Scalability is limited because conventional systems cannot expand beyond the capacity of the master node. Further, robustness is limited. Master nodes present single points of failure that must be backed up by similarly capable machines. Master nodes also incur higher hardware and administrative costs so redundancy is required in the more expensive parts of the architecture. Further still, the master/slave architecture results in additional administration expense. Such hierarchal architectures require significant configuration and monitoring to ensure the hierarchy is preserved and unexpected load accommodated. Expansion or reduction of the network requires additional configuration that creates trade-offs between network dynamicism and administrative cost.

It is with these concepts in mind, among others, that various aspects of the present disclosure were conceived.

SUMMARY OF THE INVENTION

A need exists for enhanced decentralization of large storage and processing environments. Accordingly, in one embodiment, the present invention comprises a system for managing large datasets comprising a physical network. The physical network comprises a plurality of computing devices and a plurality of processors. The system further comprises a peer-to-peer (P2P) network. The P2P network comprises a plurality of nodes and a logical network derived from the physical network. The system further comprises a distributed file system for distributing data and jobs randomly across the plurality of nodes in the P2P network, by: receiving a file by an originating data node of the plurality of nodes, with a first processor of the plurality of processors assigned to the originating data node and being configured to: divide the file into a plurality of pages, assign a value to a first page of the plurality of pages, and transfer the first page of the plurality of pages to an initial responsible data node, the initial responsible node including a name that closely matches the value of the first page of the plurality of pages; replicating the first page of the plurality of page from the initial responsible data node to a first responsible data node and a second responsible data node; receiving a job at an originating job node and dividing the job into a plurality of tasks; routing a first task of the plurality of tasks to an initial responsible job node; and assigning the first task of the plurality of tasks to a first processing node using the initial responsible job node. The system further comprises a task scheduler for delegating the first task of the plurality of tasks as necessary to optimize load distribution, by: assigning the first task of the plurality of tasks to a first queue of at least two queues in the first processing node, and forwarding the first task of the plurality of tasks to a second processing node remote from the first processing node.

In another embodiment the present invention comprises a computer program product for managing large datasets comprising a peer-to-peer (P2P) network. The computer program product further comprises a distributed file system for: dividing incoming files into a plurality of pages and distributing the pages randomly to a plurality of nodes of the P2P network; replicating each of the plurality of pages to neighboring nodes; and assigning at least one task corresponding to the plurality of pages to a first processing node. The computer program product further comprises a task scheduler for delegating the at least one task from the first processing node to a second processing node when a load value of the second processing node is less than a load value of the first processing node.

In another embodiment, the present invention comprises a method for managing large datasets, comprising the steps of forming a peer-to-peer (P2P) network comprising a plurality of nodes, each node of the plurality of nodes including at least one processor, distributing a page of a file to a first data node of the plurality of nodes, replicating the page to a second data node of the plurality of nodes, receiving a job on the P2P network, distributing a task of the job to a first processing node, and determining whether the task should be further distributed to a second processing node.

BRIEF DESCRIPTION OF THE DRAWINGS

Corresponding reference characters indicate corresponding elements among the view of the drawings. The headings used in the figures do not limit the scope of the claims.

DETAILED DESCRIPTION

Figure 1:
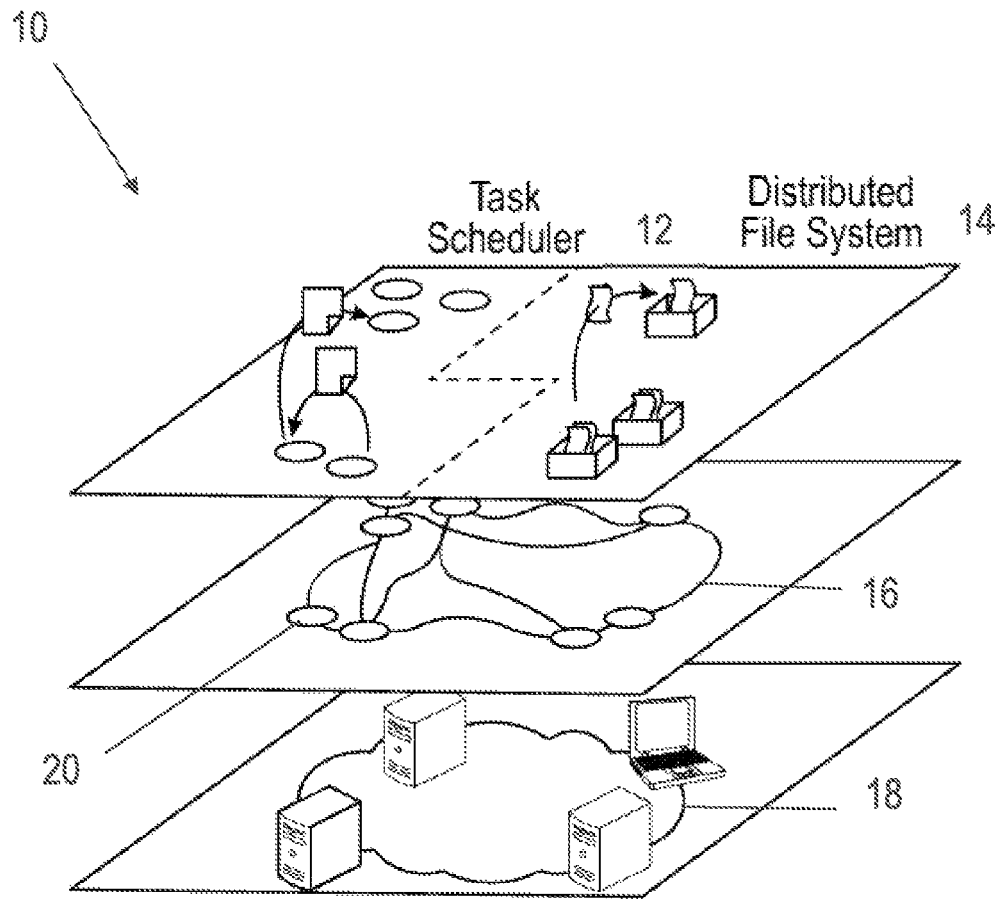
FIG. 1 is an illustration of a data management system, according to aspects of the present disclosure.

Data, now more than ever, is being collected at an unprecedented scale. Electronic devices communicate with other electronic devices with increasing frequency. Transactions that were once recorded in paper form or not recorded at all are being digitized and archived. The explosion of social media generates enormous amounts of data. Notably, much of the new data is difficult to manage because it is complex, e.g., the data can be unstructured or semi-structured. Further, complex processing requirements for big data are in demand. As one specific example, PageRank counts incoming links and analyzes every searchable page in existence.

Conventional systems and networks deploy various parallel processing tools to address big data analysis. Such systems require centralized job schedulers and/or resource allocators to manage and maintain the data. The lack of scalability with such systems makes them impractical as dozens of terabytes become petabytes and demand for improved performance grows. Further, centralized file systems tend to utilize expensive storage resources to maintain hierarchy and additional storage resources are consumed by much needed backups for the nodes maintaining the centralized file systems.

Aspects of the present disclosure include systems and methods for storing and analyzing large amounts of data and/or large datasets across a plurality of computing devices within a distributed computing network (e.g., a peer-to-peer network) that does not require a centralized management system for managing the storage and distribution of the data. In various aspects, the system may decentralize authority by executing algorithms for mapping names to various locations in the network. The system distributes storage among the network pseudo-randomly, ensuring fair load across all available network location machines (i.e. nodes). A client or user interacts with a node in a network and then that node delegates tasks and data out to the rest of the network depending on the application or job submitted by the client. Computation tasks are distributed throughout the network in an identical manner as the data they reference, and are forwarded to distribute load in a manner that minimizes the number of hops from a task to its data. In other words, data is stored randomly and in a decentralized manner, and then whichever node or peer that has the data and is best suited/available to process a task for that data becomes a processing node for a temporary amount of time. These types of distribution mechanisms achieve the same level of data locality and task-throughput guaranteed by centralized systems, but do not produce any bottlenecks. Since the system treats nodes within the computing network equally in their assumption of master and slave roles with regards to data storage, task delegation, and reporting, no one specific node is more or less important to robustness than another node, which allows for rapid failover in the event of single or massive node loss. While data or current tasks may be lost, the availability of the system remains high as load is spread evenly across remaining nodes.

In one embodiment, as illustrated in FIG. 1, a data system, framework, or data architecture (system) 10, according to aspects of the present disclosure, includes in major part, but is not limited to, a task scheduler 12, a distributed file system (DFS) 14, a logical network 16, and a physical network 18. Each of the aforementioned components is explained in greater detail below.

A physical network, or IP network 18 generally comprises a plurality of computing devices that communicate via cabling, modems, or other hardware or wireless technologies and may be used to generate one or more logical networks 16. A physical network 18 includes a topology, or the way that the computing devices on the physical network 18 are arranged and how they communicate with one another. In other words, the topology defines the way that the computing devices are physically connected to the physical network 18 through wired, e.g., cables, or wireless, e.g., Wi-Fi connections that transmit data.

The logical network 16 of system 10, in contrast to the physical network 18, defines the way signals act on the physical network 18 media, or the way that the data passes through the network from one computing device to the next without regard to the physical interconnection of the computing devices. Logical network 16 of system 10 includes a plurality of nodes 20. Nodes 20 may function as connection points, data points, redistribution points, and end points for data storage, data transmission, and data processing. Nodes 20 may comprise computing devices, e.g., processors, servers, mobile devices, or other electronic devices with connection to the network 16. The system 10 may utilize one or more nodes 20 per computing device connected to the physical network 18, e.g., one or more nodes 20 per processor. Alternatively, each computing device, or a plurality of computing devices may be configured to represent a single node 20 of logical network 16 according to aspects of the present disclosure described in greater detail below.

Figure 2:
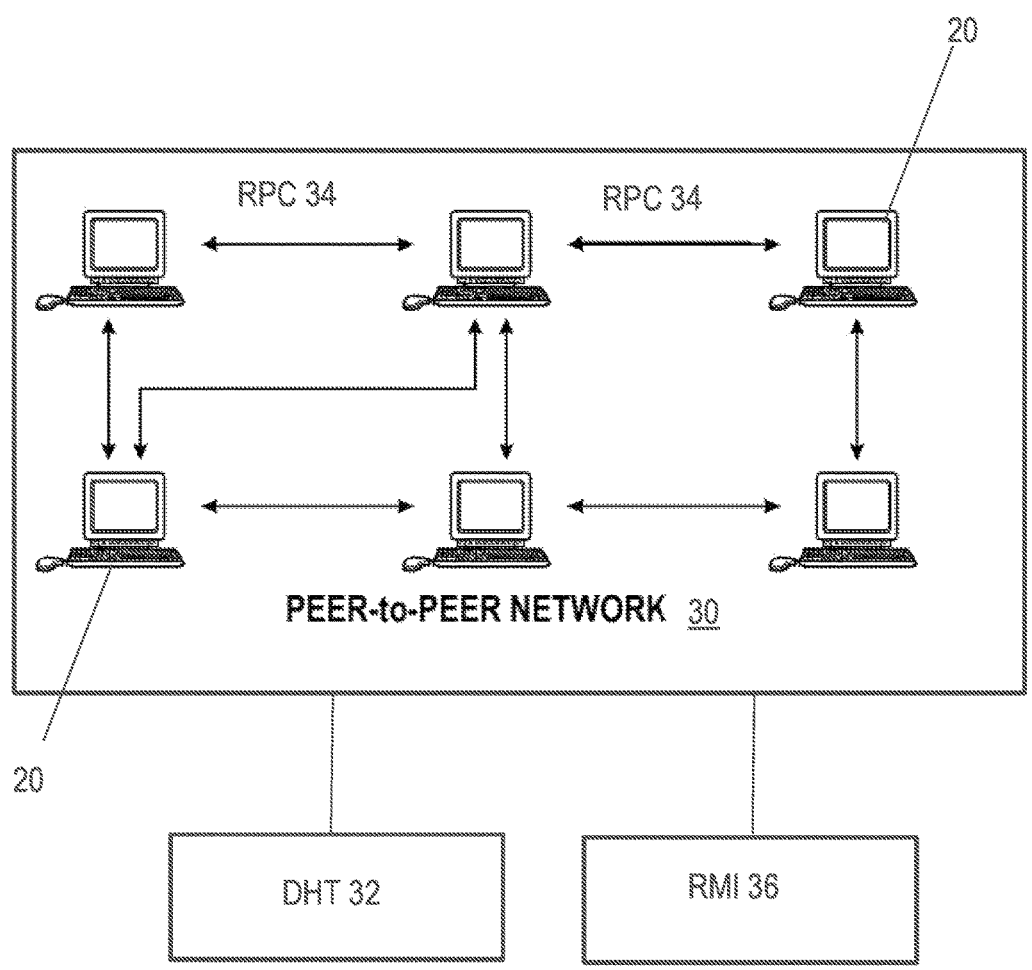
FIG. 2 is an illustration of a peer-to-peer logical network for use with a data management system, according to aspects of the present disclosure.

In one embodiment, as shown in FIG. 2, the logical network 16 includes a peer-to-peer (P2P) network 30. P2P 30 may be implemented using a content addressing system such as a distributed hash table (DHT) 32 for node lookup. A remote procedure call (RPC) framework may be used for RPC 34 communication and flow of abstraction between nodes 20. The DHT 32 further allows nearest-match lookup capability which is used to map arbitrarily named resources of a given application or job 100 to particular nodes 20, as further elaborated upon below.

The P2P network 30 represents one type of decentralized and distributed network architecture in which individual nodes 20 in the network 30 act as both suppliers and consumers of resources, in contrast to a centralized client-server model where client nodes request access to resources provided by central servers or master nodes. In a P2P network 30, tasks (such as searching for files or streaming audio/video) are shared amongst multiple interconnected peers who each make a portion of their resources (such as processing power, disk storage or network bandwidth) directly available to other network participants, without the need for centralized coordination by servers or master nodes.

The P2P network 30 can facilitate inter-node application communication by opening RPCs 34, i.e., communication channels between nodes 20; the RPCs 34 are themselves defined by the application or job 100. Applications or jobs 100 can therefore be agnostic to the implementation of the network 30. An underlying network protocol can be implemented without changing application logic so long as the protocol provides name lookup and RPCs 34. Further, the distinction between node 20 and physical peer/computing device is irrelevant to the application and system 10, so a single high-capacity peer or computing device can act as multiple lower-capacity nodes 20 to partition its resources.

P2P network 30 is highly flexible and scalable. Additional nodes 20 can be added to the P2P network 30 based on the computing devices in the physical network 18. Certain computing devices of physical network 18 can be assigned more nodes 20 where the devices can support heavy processing and storage. In addition, if new nodes 20 are added, data can be migrated automatically and dynamically over to the new nodes 20 where appropriate.

According to one embodiment, the P2P network 30 maintains constant communication between computing devices (peers) in the P2P network 30 according to a specific type of DHT known as the Kademlia protocol discussed further below. The P2P network 30 assigns each peer a random unique name and facilitates finding a peer in the P2P network 30 according to some search string; the peer found is that whose name most closely matches the search string according to their hamming distance (number of bits of difference).

The DHT table 32 maps globally unique identifiers for individual nodes 20 and allows node lookup using nearest matching on arbitrary keys. Applications or jobs 100 locate named resources in the P2P network 30 at the nodes 20 whose identifiers most closely match the resources names. The random distribution of node names and nature of the DHT 32 implementation improves even and random distribution of named resources and eliminates hot spots of resource allocation. Keys in the DHT 32 are node IDs which in some embodiments are 160-bit SHA-1 hashes of random unique identifiers, andlues are their IP addresses from the physical network 18. The distribution of names and values produced by SHA-1 algorithm allows an application or job 100 distributing load to named nodes 20 to be automatically balanced regularly across all available nodes 20.

As further shown in FIG. 2, communication between a™ cations on separate nodes 20 may be facilitatby the Java TM Remote hod ocation (RMI) framework 36. An application or job 100 communicates with a remote node 20 or peer, via a proxy, that is, a small object mocking the interface of the remote application. Proxies are obtained from remote peers via a simple user datagram protocol (UDP) request to which the remote peer responds with a pre-generated proxy describing the interface and necessary connection parameters. Invoking a method on the proxy dispatches a request via a TCP channel (facilitated by the RMI framework 36) to the remote peer; the remote peer invokes its local method and returns the result via the same TCP channel. Proxies are shared as a part of the peer discovery protocol, creating a logical network of application interfaces overlaid on the P2P network 30.

The RMI framework 36 enables rapid prototyping and ease of implementation of complex interfaces not necessarily possible when modifying existing systems. The use of the RMI framework 36 for peer messaging enhances reliability and simplifies the implementation of complex RPCs 34. The provision of proxies by the target peer allows that peer to specify additional connection parameters, potentially enabling complex routing such as NAT transversal. Further, the RMI framework 36 forms an abstraction between the application and the underlying P2P network 30. Alternatively, or in conjunction with the RMI framework 36, the system 10 may include purpose-built communication protocols. In some embodiments, instead of or in conjunction with RMI framework 36, system 10 may further include COBRA, D-Bus, SOAP, .Net Remoting, DOOM, or Thrift to enable communication and software procedures/functions across nodes 20.

The RMI framework 36 is designed to be robust enough for transferring large objects passed as parameters. Those objects should, however, be in memory, and can be copied into the memory of the receiving host. Multiple parallel exchanges of large objects may starve the participants of memory and threaten their stability. Accordingly, in some embodiments, a bulk data streaming API may be utilized to stream data directly from and to the hard disk. For example, bulk data transfers may be handled by RMIIO. RMIIO is a library which makes it as simple as possible to stream large amounts of data using the RMI framework 36 (or any RPC framework).

Figure 3A:
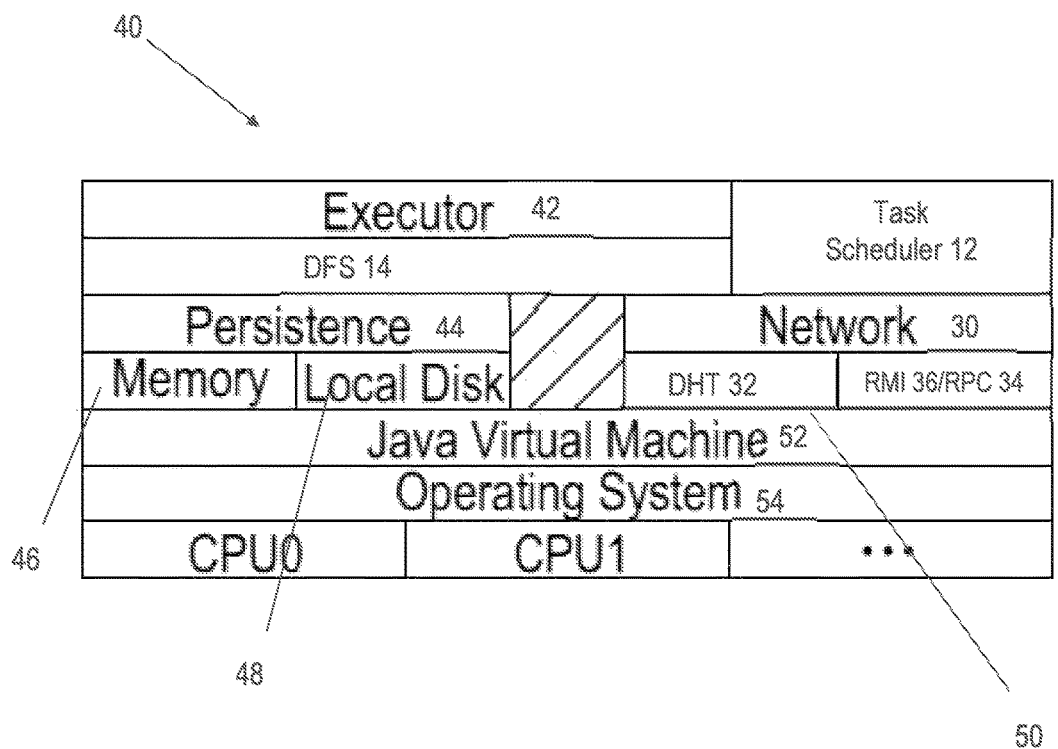
FIG. 3A is an illustration showing a service stack for each node of a data management system, according to aspects of the present disclosure.
Figure 3B:
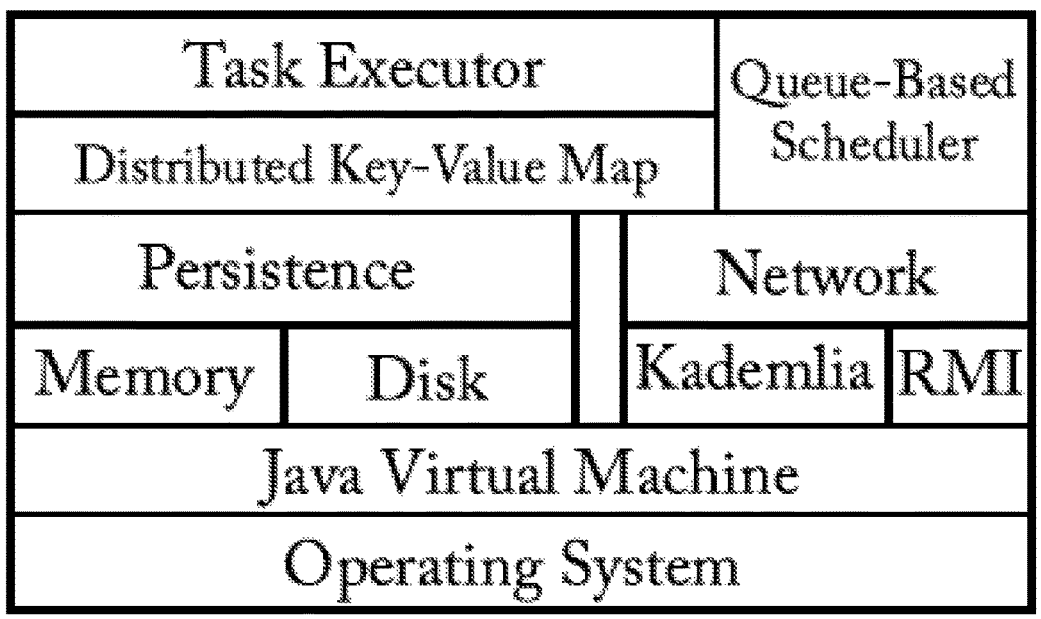
FIG. 3B is an illustration showing an alternate service stack for each node of a data management system, according to aspects of the present disclosure.
Figure 4A:
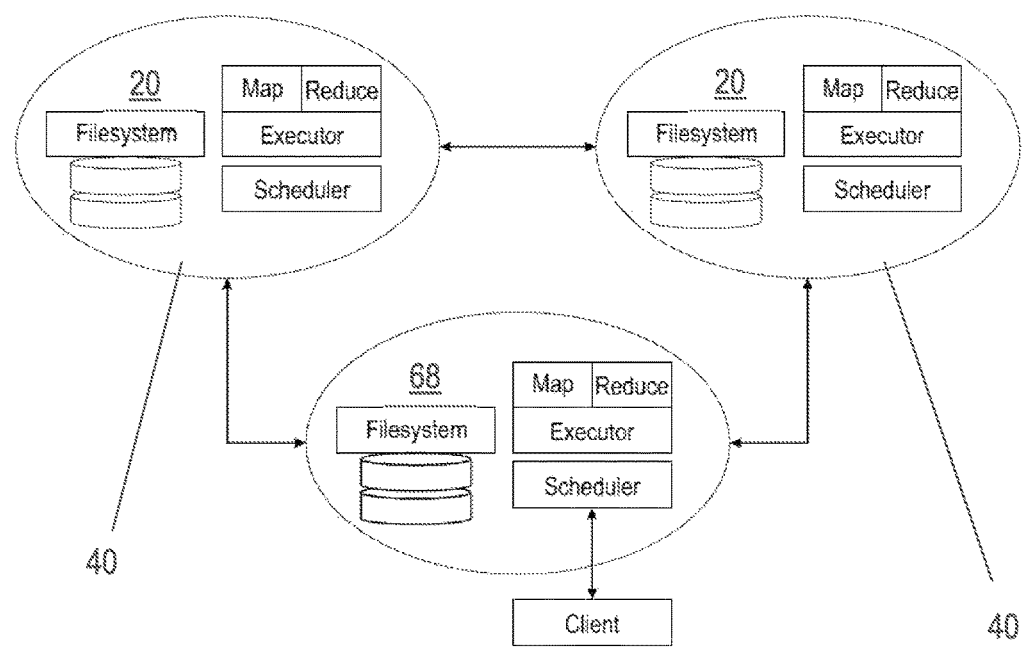
FIG. 4A is an illustration showing interconnected nodes of a network with each node having an instance of the service stack from FIGS. 3A-3B, according to aspects of the present disclosure.
Figure 4B:
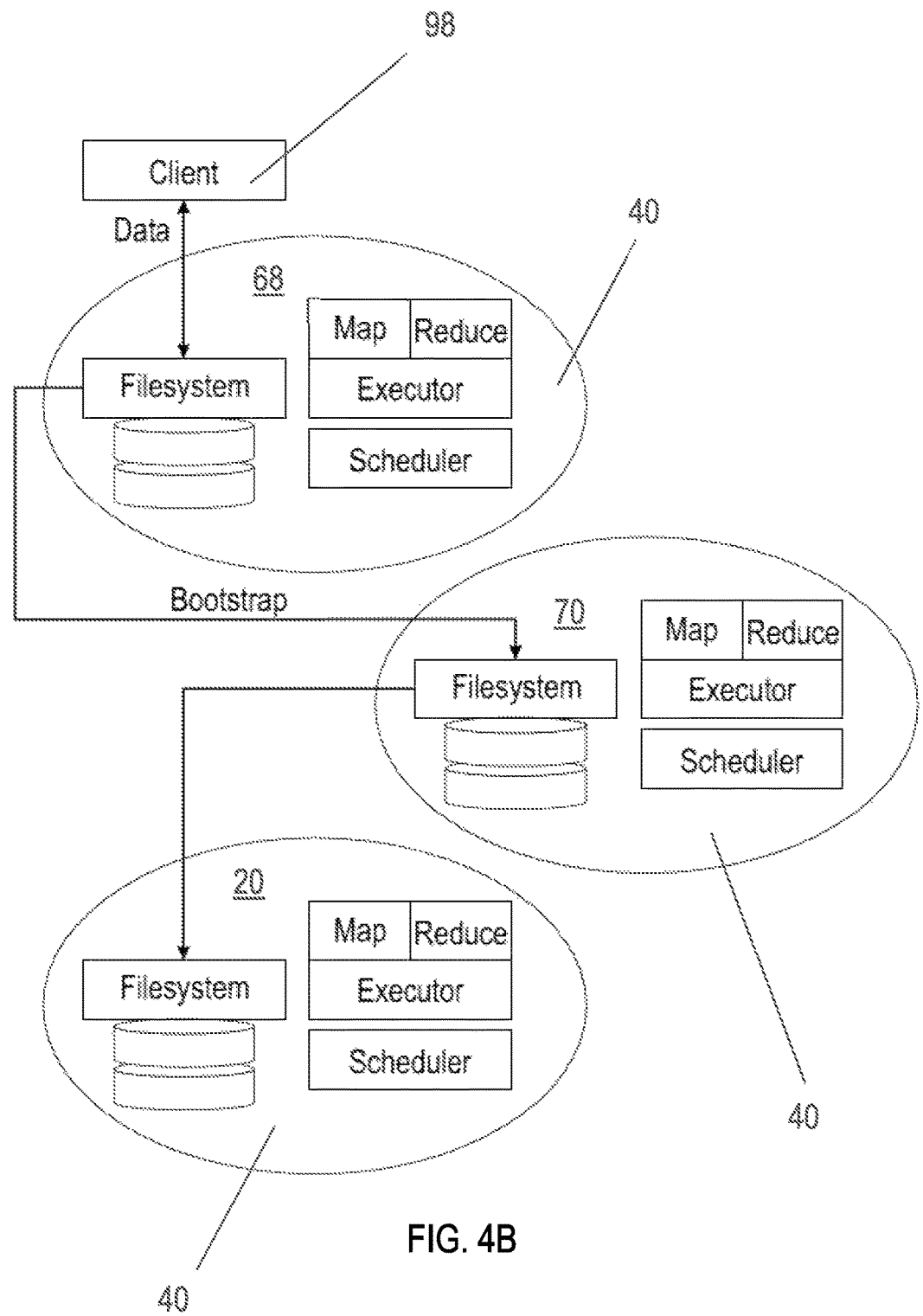
FIG. 4B is an illustration showing interconnected nodes of a network with each node having an instance of the service stack from FIGS. 3A-3B and with one of the nodes being a bootstrap or originating data node and one of the nodes being an initial responsible data node, according to aspects of the present disclosure.

Because each node 20 in the P2P network 30 may be called to perform any particular role (e.g., data storage, task execution, or job delegation), each node 20 supports the same service stack 40 which is illustrated in FIG. 3. Service stack 40 may include task executor 42, which may be any node 20 in the system 10 capable of processing various tasks. Service stack 40 may further include DFS 14, task scheduler 12, persistence 44, P2P network 30, RMI network 36, RPCs 34, memory 46, local disk 48, DHT 32, a Java virtual machine 52, an operating system 54, and one or more computing devices represented in FIG. 3A as "CPU0" and "CPU1." FIGS. 4A-4B show individual nodes 20 in communication with each other with each node including service stack 40.

In one embodiment, service stack 40 includes Java TM Virtual Machine (JVM) 52 for running software of system 10 in varying environments, specifically in different operating systems or computer hardware, without modifying the software. Hardware and operating system agnosticism is facilitated by the JVM 52. Alternatively, instead of or in conjunction with JVM 52, system 10 may include Zulu, Apache Harmony, HotSpot, Avian, IcedTea, or Azul.

Service stack 40 further includes a persistent service 44, composed of a memory cache or memory 46 and disk storage or local disk 48, which manages data held by the node 20 to further abstract the application from the local environment. In some embodiments, persistent service 44 may include Memcached, BigTable, MySQL, Cassandra, MongoDB, or CouchDB.

A network service manager 30 of service stack 40 manages the DHT 32 and facilitates RPCs 34 between local and remote applications. These services separate the applications concerns from network and storage concerns so that application changes or transient unavailability have minimal impact on the network. In other words, the software maintaining the network of nodes 20 in the system 10 can be separated from the applications processing tasks such as mapping and reducing. As such, if a problem occurs with a task itself on a given node 20, it can't drop that node out of the network and it can't harden the network's availability. The node 20 can still participate in managing other nodes 20, or managing the topology of the network and keeping track of intercommunication between nodes 20. Consequently, system 10 can separate the physical system from the logical processing jobs.

In one embodiment, DHT 32 utilizes a Kademlia module 50. In one embodiment, Kademlia module 50 includes the Kademlia algorithm which is a distributed algorithm for enabling voluminous amounts of peer computers and devices to store and disclose information collectively. Alternatively, in some embodiments, Chord or Mainline DHT may be utilized. Kademlia module 50 specifies the structure of the P2P network 30 and the exchange of information through node lookups. It provides an ideal topology of named nodes 20 for distributing data evenly across the P2P network 30, eliminating hierarchical load distribution. In some embodiments, social trust relationships may be incorporated into the system 10 and Kademlia module 50 to prevent against Sybil attacks and may involve electric routing tools. Alternatively, DHT 32 may utilize or include Chord, Koorde, a content Addressable Network (CAN), Mainline DHT, Cassandra, Aerospike, BATON Overlay, Pastry, P-Grid, Riak, Tapestry, or TomP2P.

FIG. 3A further shows scheduler 22 as previously introduced in FIG. 1, which may be a queue-based scheduler. Scheduler 22 is fully distributed and requires information exchange only among neighboring nodes 20. The scheduler 22 dynamically and adaptively balances the load in the network, and uses specialized queues which make optimizing of the network locally straightforward. Scheduler 22 is explained in greater detail below.

Service stack 40 further includes DFS 14 which will now be explained in greater detail. DFS 14 accomplishes enhanced decentralization and fault tolerance distribution of data by using the load balancing inherent to P2P network 30 to balance files regularly across the P2P network 30 and balance task allocation across the P2P network 30. DFS 14 stores and retrieves named binary data in parts of predetermined size. DFS 14 divides incoming jobs into tasks, each task being associated with a single part of a target file. File parts, or pages, are distributed evenly about the network and tasks are distributed to the nodes bearing the relevant part. In one embodiment each page of a file has a name which includes the name of the file and the number of the page which is used to generate a hash value for each page. When a node is created in the system 100, the node is also assigned a unique name which may be a string of characters; alphabetical and numeric. The page with a hash value most closely matching the name of a given node is assigned to that node. A comparison of "closeness" between a name of a node and a hash value of a page can involve a mathematical comparison of shared character values between the node and page and can further include physical distance between the node and page. Once a task has been distributed to the appropriate data-bearing node, scheduler 22 present on every node further distributes the task in the neighborhood of the data to reduce load hot spots while optimizing centrality.

With DFS 14, the manner in which the nodes of the P2P network 30 are distributed across the physical network 18 is random so that page distribution is also highly randomized. Further, based on the same randomization, task allocation becomes highly randomized with an even spread of task allocation across the P2P network 30 such that no one node 20 is unduly burdened with overload.

Figure 5:
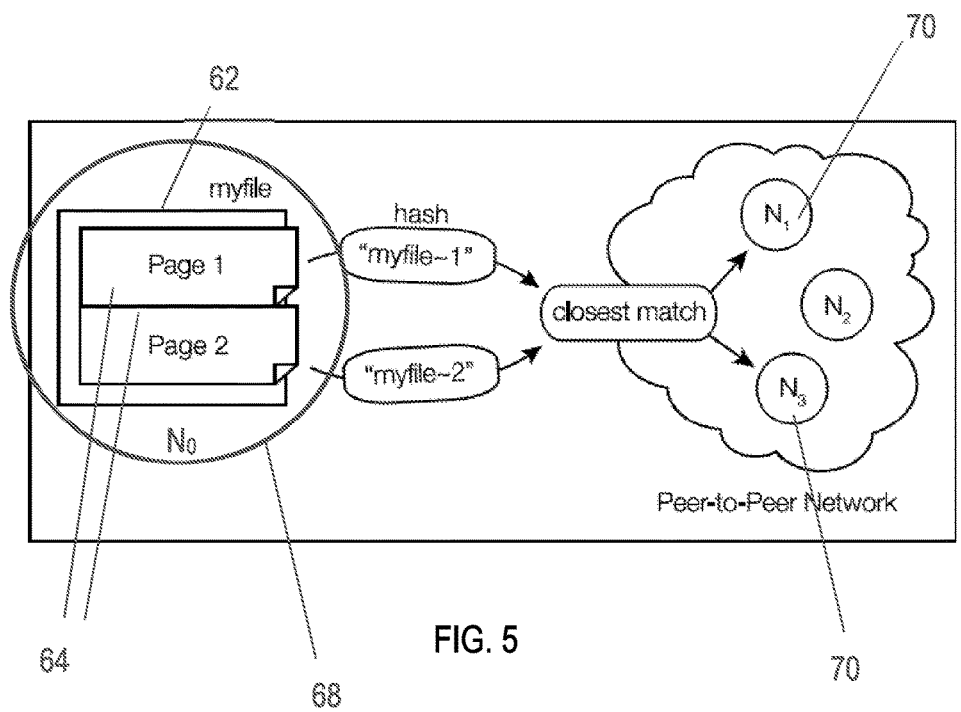
FIG. 5 is an illustration showing exemplary steps of storing data in a data management system, according to aspects of the present disclosure.

In one embodiment, as shown in FIG. 5, the DFS 14 is a file system in which the contents of the files are distributed among the members of the P2P network 30 and the locations of the file contents are derived mathematically from their names. A file 62, incoming to system 10, is divided into smaller parts, chunks, or segments named pages 64. Each page 64 may be distributed to a node 20 most closely matching the name of the page 64. More specifically, a hash value assigned to each page 64 is compared to a unique identifier or name of a node 20. A node 20 may be assigned to a given page 64 where the identifier of the node 20 meets a threshold mathematical closeness when compared to the hash value of the page 64. In some embodiments, DFS 14 includes or is implemented in conjunction with a Google ® File System, Hadoop Distributed File System, or Cloud-Store.

Preferring smaller, more numerous pages 64, increases randomness of the network distribution and decreases the time and bandwidth needed to copy an individual page 64 between nodes 20. With very large data sets, however, smaller pages 64 increase page management overhead. Additionally, if each page's contents are processed independently, the time spent processing each page 64 may not amortize the set-up cost for the page 64. Accordingly, in some embodiments, an optimal page size is predetermined to amortize the set-up cost on a majority of the machines in the P2P network 30 while minimizing the responsibility of any node 20 for the file. Further, pages 64 can be resized post-creation to accommodate changing data.

FIG. 5 illustrates the distribution of data by DFS 14 as the data arrives within system 10. Introducing data to the system 10 can occur through one or more originating data nodes 68. For example, as shown in FIG. 5, a file 62, such as "myfile" arrives at a originating data node 68. Originating data node 68 can be any node 20 within the system 10 and P2P network 30. Alternatively, in some embodiments, a set of nodes 20 can be assigned priority such that the nodes 20 are more likely to receive incoming data and become originating data nodes 68 than other nodes 20 within system 10. Stated another way, originating data nodes 68 can be predetermined. Assigning priority to one or more nodes 20 can be consistent with the desired configuration of system 10. For example, in one embodiment, it may be more advantageous to have a certain set of nodes 20 be originating nodes 68 based on the technical parameters and capabilities of certain nodes 20 and their underlying computing devices.

In one embodiment, the files 62 are referred to as tables and are assigned names. Tables are distributed on the P2P network 30 in pages 64, or subsets of a predefined constant maximum size, according to the distribution of a cryptographic hash function (a pseudorandom distribution). The pages 64 are named by concatenating the table name and the page's index. Pages 64 received by peers in the P2P network 30 may be stored both in a constant-size memory cache and/or on disk. The name of the table is sufficient for later retrieval of all pages associated with that table from the P2P network 30, and individual pages 64 can be retrieved if their sequential index is known. The peer to which a page 64 is distributed is the peer whose random unique name most closely matches the hash of the page's name according to the same closeness measure provided in P2P network 30.

Returning to FIG. 5, upon reaching the originating data node 68, the file 62 is divided into one or more pages 64, represented in FIG. 5 as "Page 1" and "Page 2." Pages 64 can then be assigned a hash value corresponding to the name of the page 64; represented in FIG. 5 as "myfile~1" or "myfile~2."

From a distribution queue of data originating node 68, each page 64 is then sent to another node with the "closest match", i.e., sent to a node 20 whose name most closely matches the hash name of the page 64. The matching node becomes the initial responsible data node 70 for that page 64.

Data Replication

Figure 6:
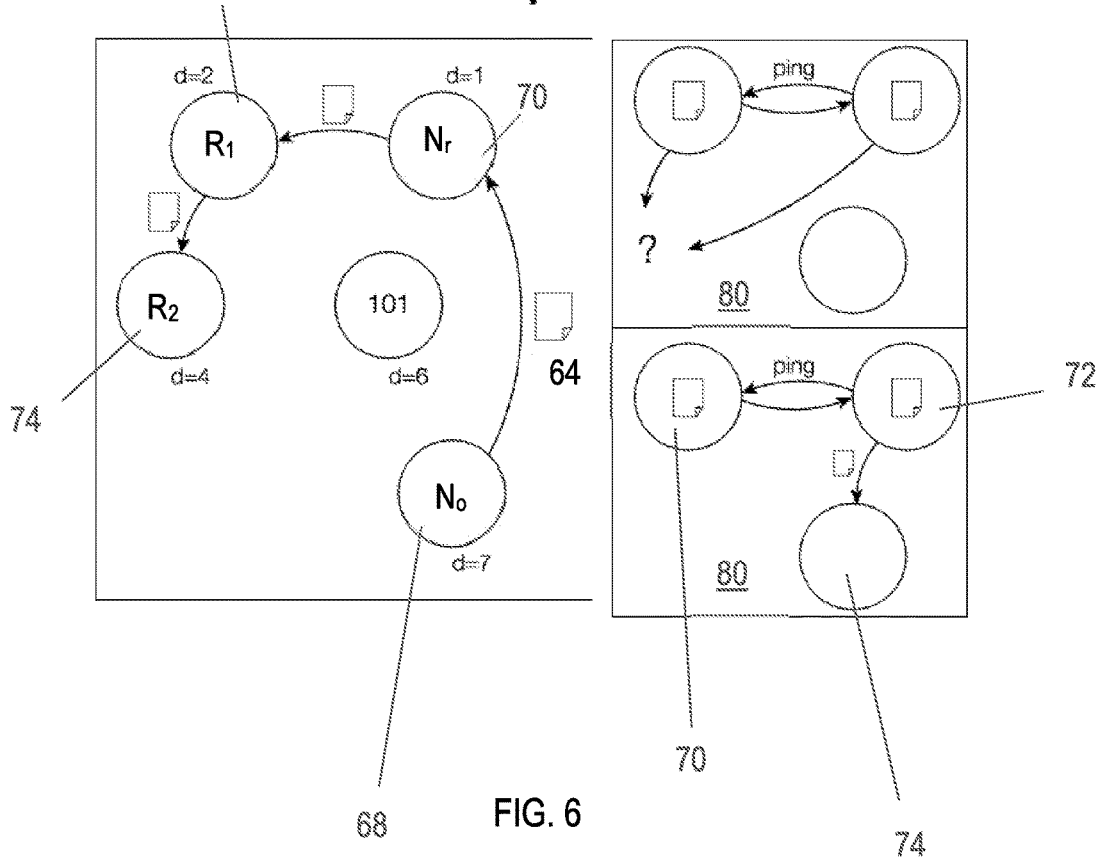
FIG. 6 is an illustration showing one embodiment of data replication to provide enhanced redundancy for a data management system, according to aspects of the present disclosure.

FIG. 6 illustrates one embodiment of data replication to provide enhanced data redundancy to the system 10. As described above, a data file 62 can be divided into pages 64. Each page with index i can be distributed to a node 20 which most closely matches the page's name. From an originating data node 68 or $N_0$ the page 64 can be distributed to the page's initial responsible data node 70, which can be represented as $N_r$. Thereafter, each page 64 is replicated, starting with the initial responsible data node 70, by $D^i_j$ to the next most closely matching node, with d representing distance and j representing nodes. Replication can be represented as $D^i_{j+1}$. More specifically, the initial responsible data node 70 replicates to a first responsible data node 72 or $R_1$, and the first responsible data node 72 is responsible for replicating the page 64 to a second responsible data node 74 or $R_2$. In some embodiments, the initial responsible data node 70, the first responsible data node 72, and the second responsible data node 74, (three nodes) collectively, form a group 80, are the nodes 20 most closely matching the page 64, are considered equally responsible for the page 64, and are randomly selected when a node 20 requests the page 64. Thus, data redundancy is achieved by distributing each page 64 to not just the closest matching node 70, but also to the two next-closest matching nodes (first responsible data node 72, and the second responsible data node 74). Alternatively, the page 64 is replicated from the originating data node 68 or initial responsible data node 70 until a predetermined value, k, replicates are held. In some embodiments, k may be within a range of 1-10, 10-20, or 20-50. In other words, group 80 may, in some embodiments, comprise at least two nodes.

When the first-closest node 20 receives the data, i.e., initial responsible data node 70, it establishes constant communication between the other nodes such as first responsible data node 72, and the second responsible data node 74, with communication maintained at a constant interval and if one of the nodes 70, 72, or 74 should become unreachable, one of the two remaining nodes copies the page 64 to the next most-closely matching node, ensuring redundancy. The nodes 20 most closely matching the page 64 (nodes 70, 72, and 74) can be considered equally responsible for the page 64 and are randomly selected from when a node 20 requests the page 64.

The nodes in $D^i$, nodes 70, 72, and 74, join a logical P2P network 30 unique to the file 62 and form group 80. Nodes in group 80 and P2P network 30 monitor each other frequently; if one node is discovered to go down or fail, another random node of the remaining nodes is selected by consensus on the largest of random numbers selected by each node. The selected node 20 determines the next closest node to the page that does not already hold the page 64 and replicates to it. In other words, as shown in FIG. 6, periodic keep-alive messages ("pings") between responsible nodes ensure replication is maintained. Stated another way, to guard against transparent data loss if all data nodes are lost simultaneously, all nodes $D^i$, with $_i>0$, periodically monitor $D^{i-1}$ and raise an alert if the page 64 cannot be found. By alerting the P2P network 30 of their presence, the nodes holding the tail of a file ensure that the file cannot be entirely lost due to page discontinuities. This robustness can be accomplished without central indexing or monitoring.

When a node 20 replicates a page 64 to another node 20, it also sends a list containing the names of the nodes 20 that are also responsible for page 64. each node 20 receiving a page 64 adds the name of the page 64 and the list to its responsibility table. That node 20 must send periodic keep-alive messages to each node 20 in its responsibility table to ensure that replication is maintained; these messages contain the name of the page and the known responsible nodes for that page. If the node 20 receives a keep-alive message naming nodes not stored in its own responsibility table, it adds them to it.

Fault tolerance is achieved by the system 10 and the aforementioned replication process. If a node 20 fails to respond to a keep-alive message, it may be immediately considered dead. Of the remaining responsible nodes, the one which is most distant to the page replicates the page to the next closest node as above. Data loss may only occur if all three nodes fail in rapid succession, but the random distribution of node names ensures that physical proximity between three of many nodes is unlikely.

Again, to avoid transparent data loss in the event that all three nodes are lost, each node with group 80 periodically contacts other nodes; if a node 20 does not respond then a data loss event is signaled for the page 64 associated with that node 20. The random distribution of pages 64 in the network 30 ensures that replicates are likely to exist across physical networks, limiting the likelihood of losing all replicated nodes 20 simultaneously. Furthermore, selecting small page sizes minimizes the time needed to replicate a page in the event of failure, narrowing the window in which successive node failures can result in data loss, reducing transfer times, and maximizing the fully replicated time for a page in a volatile network.

Specific Data Input Operations

The DFS 14 supports creation, deletion, random write, random read, and appendation. Pages 64 can also be locked to synchronize concurrent modification. With a Create operation, each file 62 is given a globally unique name. A name in the form of "abc/def/" would produce a file 62 named "xyz" in the hierarchy abc/def, which is only a convention for dividing the global namespace and is not analogous to a hierarchical directory structure utilized by conventional data systems.

Files 62 are created by specifying one of new, overwrite, or append. If a file 62 exists with a given name, the overwrite mode will notify all nodes 20 with knowledge of the file 62 to dispose of existing data before sending any data from the new file. The append mode instead begins with the node after that containing the tail of the file, thus extending the file.

In one embodiment, file input and output (I/O) is performed using buffered byte streams specialized to the task of managing distributed pages 64. The output stream keeps a running page index which starts at the first page and increments once for each page filled. Bytes written to the stream are buffered up to a predetermined page capacity; when full or if flushed, the buffer is named with the concatenation of the file name and the current index and placed in a parallel distribution queue.

With DFS 14, the input stream comprises a reading buffer and an incoming page 64 deque. The reading buffer stores one complete page 64 in memory and marks its index. Parallel tasks retrieve the next pages in sequence and place them in order on the bottom of the deque. When the reading buffer is empty, it is replaced with the next page on top of the deque. The end of the file (EOF) is signaled by poisoning the page deque when a remote node responds to a page request with unknown file.

The number of pages 64 in a file 62 is not stored by any node 20, so appending data can comprise iterating to one node 20 beyond the tail of the file 62.

Data can be appended to a file 64 using the above output stream, but starting the index at j instead of 0.

A particular page 64 of a file 62 can also be entirely replaced with another arbitrary page in order to e.g., modify a page. The old page is not discarded while being read, but new reads are served by the replacement page.

Individual pages 64 of a file 62 can be locked for writing to protect them during subsequent atomic read operations. Locks are not a security feature but are instead simply synchronization primitives: a lock can be overridden by a node 20 that obtained it to allow atomic read/write sequences.

Page Communication/Transfer Between Nodes

One embodiment of page communication and transfer between nodes 20 is now provided. As described above, the node 20 from which pages 64 are distributed is called the originating data node 68. The node to which a page 64 is distributed from the originating data node 68, the initial responsible data node 70, is identified as the node whose name most closely matches the hash value/name of the page 64.

A page transfer can be initiated by the sending node 20 (originating data node 68) offering the name and size of a page 64 to a receiving node (initial responsible data node 70). The receiving node 70 then responds with a TCP port on which it has begun listening. The sending node 20 connects to this port and, using a bulk data protocol, uploads the contents of the page 64. The receiving node 70 accepts the incoming data directly to disk where it becomes immediately available for use.

Metadata

Maintenance of metadata can be important to maintaining a general distributed file system. In a centralized environment, maintenance of metadata is normally accomplished using a small number of tracking nodes, such as Hadoop's NameNode. Robustness is achieved by replacing the metadata continuously or periodically to minimize the impact of a lost metadata node. This idea can be extended to a highly decentralized environment such as DFS 14, but presents the same limitations.

To avoid the event that a file 62 or its metadata becomes lost or corrupt, each page 64 of a file 62 is named with the file's name concatenated with the integral index of the page 64. All of a file's pages 64 can be found by iterating over the page 64 indices and requesting each in turn. The first index i where all nodes that should know of pages i and i+1 respond negatively is assumed to be the end of the file and the file is assumed to be i−1 pages long. Metadata that is unlikely to change frequently is stored with all pages of a file. Since any metadata which changes frequently would need to be either stored on one master node (increasing centralization) or on all nodes (incurring network costs for updates), any such metadata can optionally not be stored by the system 10.

Task Execution

Figure 7:
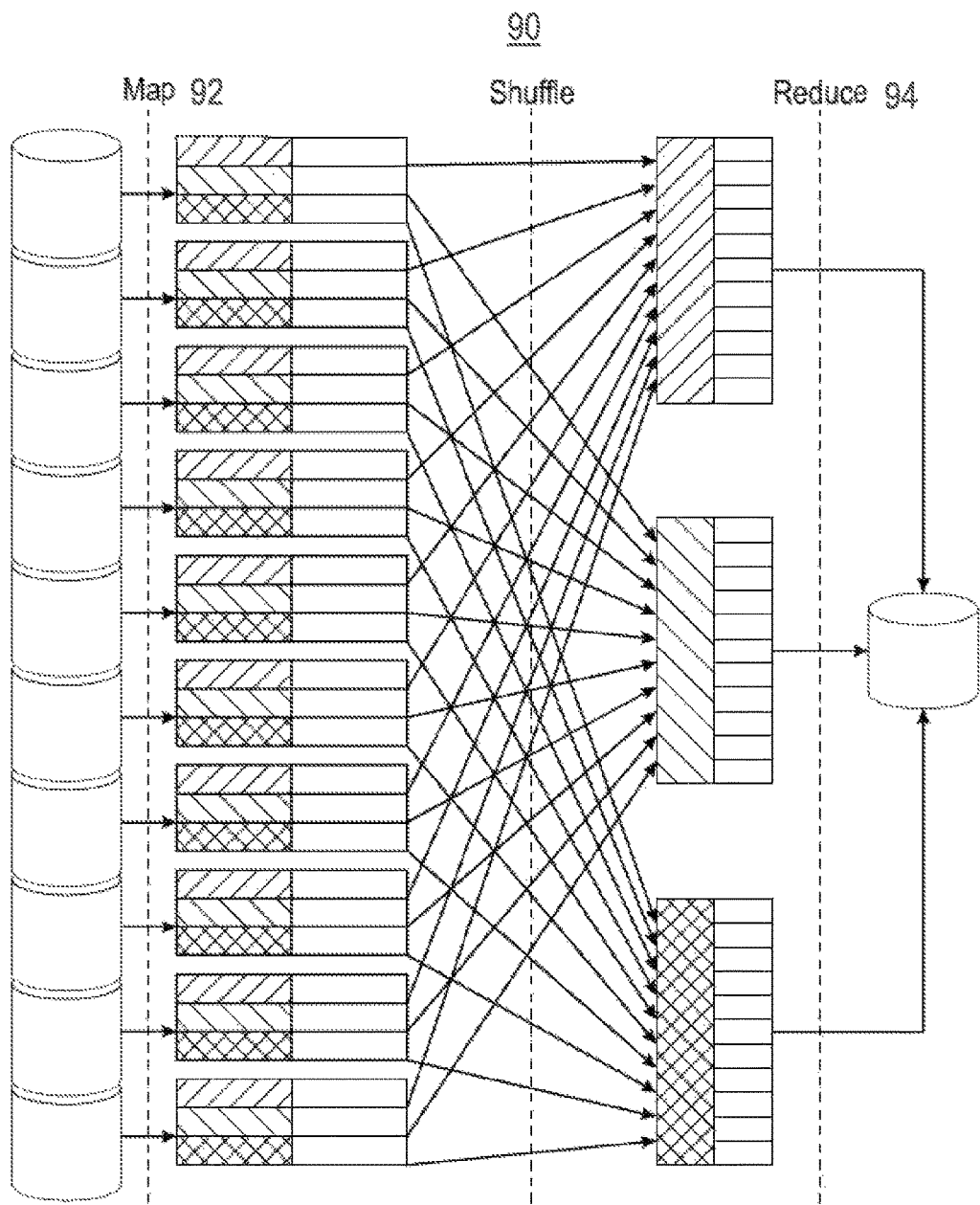
FIG. 7 is an illustration of a MapReduce application utilized in some embodiments of the system, according to aspects of the present disclosure.

Task execution, by task executor 42 according to aspects of the present disclosure will now be explained in greater detail. Task executor 42 executes user-supplied code in a virtual computer environment wherein that code is isolated from the physical computer hardware and its software. In some embodiments, task executor 42 and DFS 14 utilize a divide and conquer parallel dating processing application in which individual subsets are processed simultaneously. One such type of divide-and-conquer application includes a MapReduce application 90. An exemplary embodiment of a MapReduce application 90 is shown in FIG. 7. A MapReduce application 90 takes an input and produces an output as key→value pairs. In other words, the MapReduce application 90 can enable the parallel execution of functions that transform (key, value) pairs in a database. The execution occurs in two stages: the map stage applies a map function to each (key, value) pair to process data and produces an intermediate set of pairs. The intermediate pairs are grouped by key and the reduce stage applies a reduce function to all values sharing the same key, combining them into one key. The result is a new file containing the product of the map and reduce functions. Parsing the input file is left to the map function. In some embodiments, the page can be guaranteed to contain only complete (key, value) pairs so that no pair is split between two instances of the map function; this assurance is given by the particular data loading routine used to input the file into the system. The MapReduce application 90 facilitates the distribution of computation tasks to the nodes 20 of the P2P network 30 responsible for the data (pages 64) with which tasks are concerned. Nodes 20 within system 10 may be assigned map task functions and be designated as map nodes 114 and some nodes 20 may be assigned reduce functions and be designated as reduce nodes 104. Alternatively, in place of or in conjunction with a MapReduce Application 90, system 10 may utilize a Hadoop, Spark, or Disco application.

The P2P network 30, the DFS 14, and the MapReduce application 90 may be used to delegate, schedule, map, and reduce tasks at various nodes 20 within the P2P network 30 as illustrated in FIGS. 7, and 8A-8C. The combination of an input file 62 name, a map function 92, and a reduce function 94 is called a job 100. Because the map 92 and reduce functions 94 are trivially parallelizable, each job 100 is divided into tasks 102 which run on separate nodes 20. Since each page 64 is guaranteed to contain only valid pairs, the job 100 may be split with one task 102 per page 64 such that all tasks 102 have valid data. Reduce functions 94 can be delegated by assigning the functions to each of a maximum number of reducer nodes 104 as specified in the job 100 configuration. Tasks 102 may be delegated to the same reducer nodes 104 or different nodes 20 designated as map nodes 114. Each reduce function 94 specifies the map tasks 112 to be expected so the reducer nodes 104 can identify tasks that fail to start. In some embodiments, tasks 102 may include sub-jobs, job subsets, joblets, or map tasks 112. When utilizing MapReduce application 90, tasks 102 of system 10 may be referred to as map tasks or simply tasks 112.

Figure 8A:
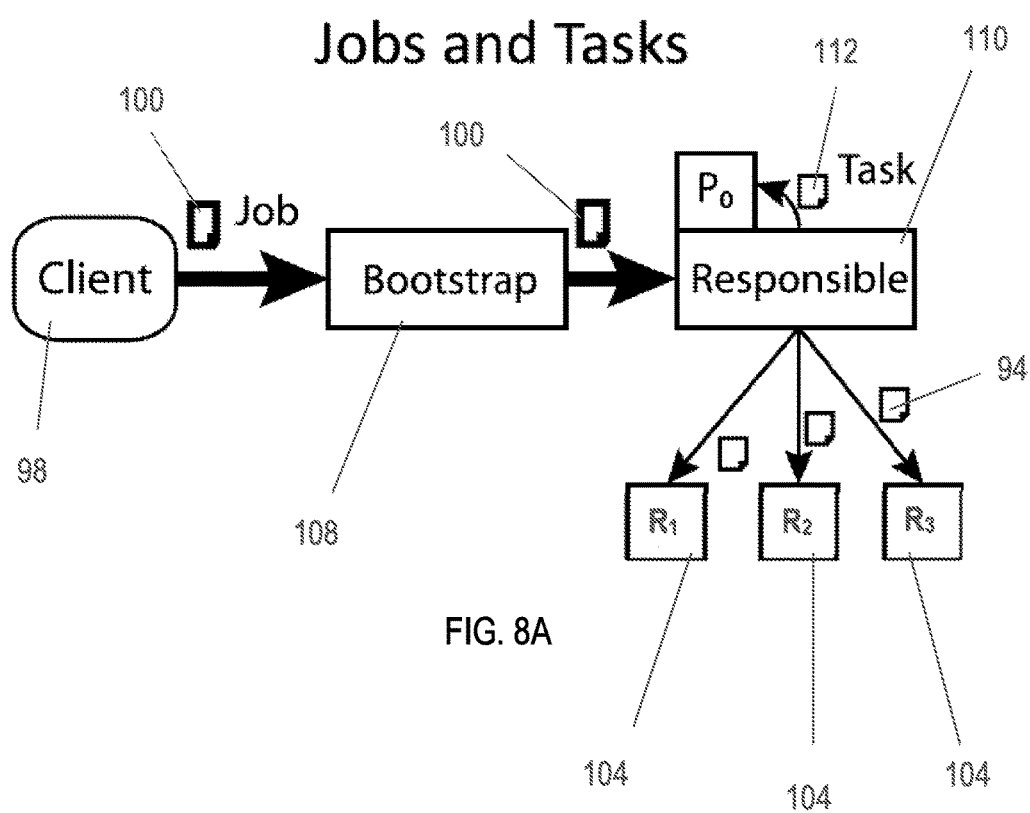
FIG. 8A is an illustration showing the allocation of jobs and tasks to nodes of a system, according to aspects of the present disclosure.
Figure 8B:
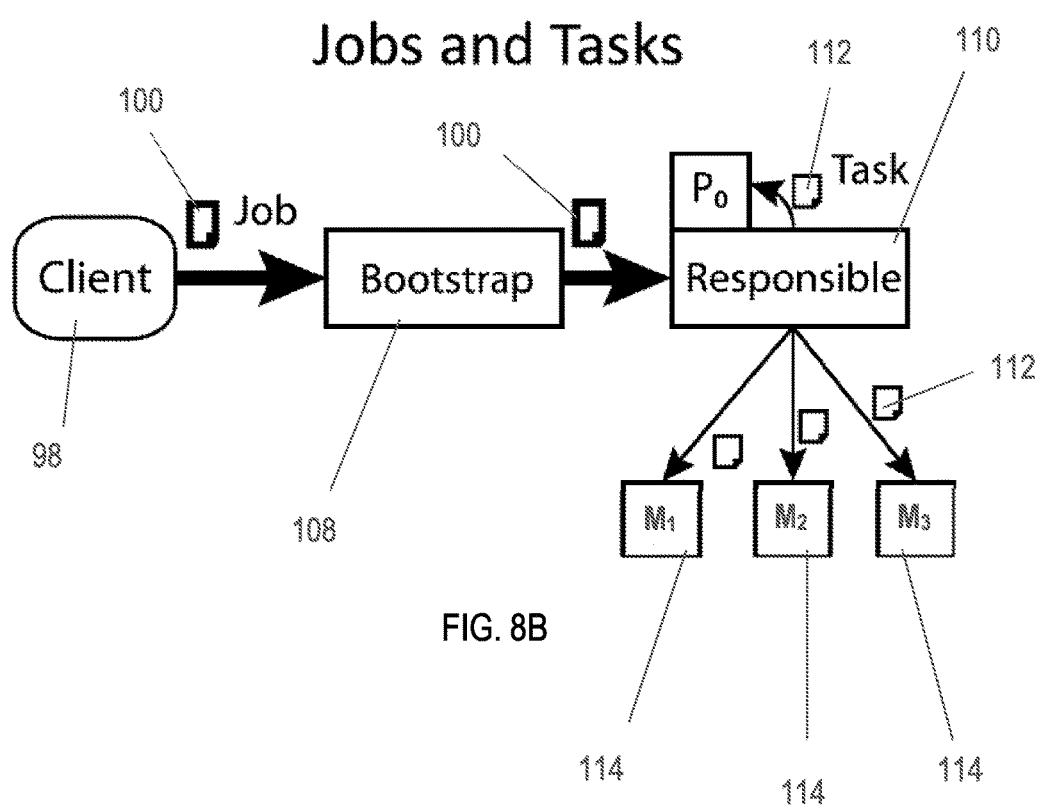
FIG. 8B is another illustration showing the allocation of jobs and tasks to nodes of a system, according to aspects of the present disclosure.
Figure 8C:
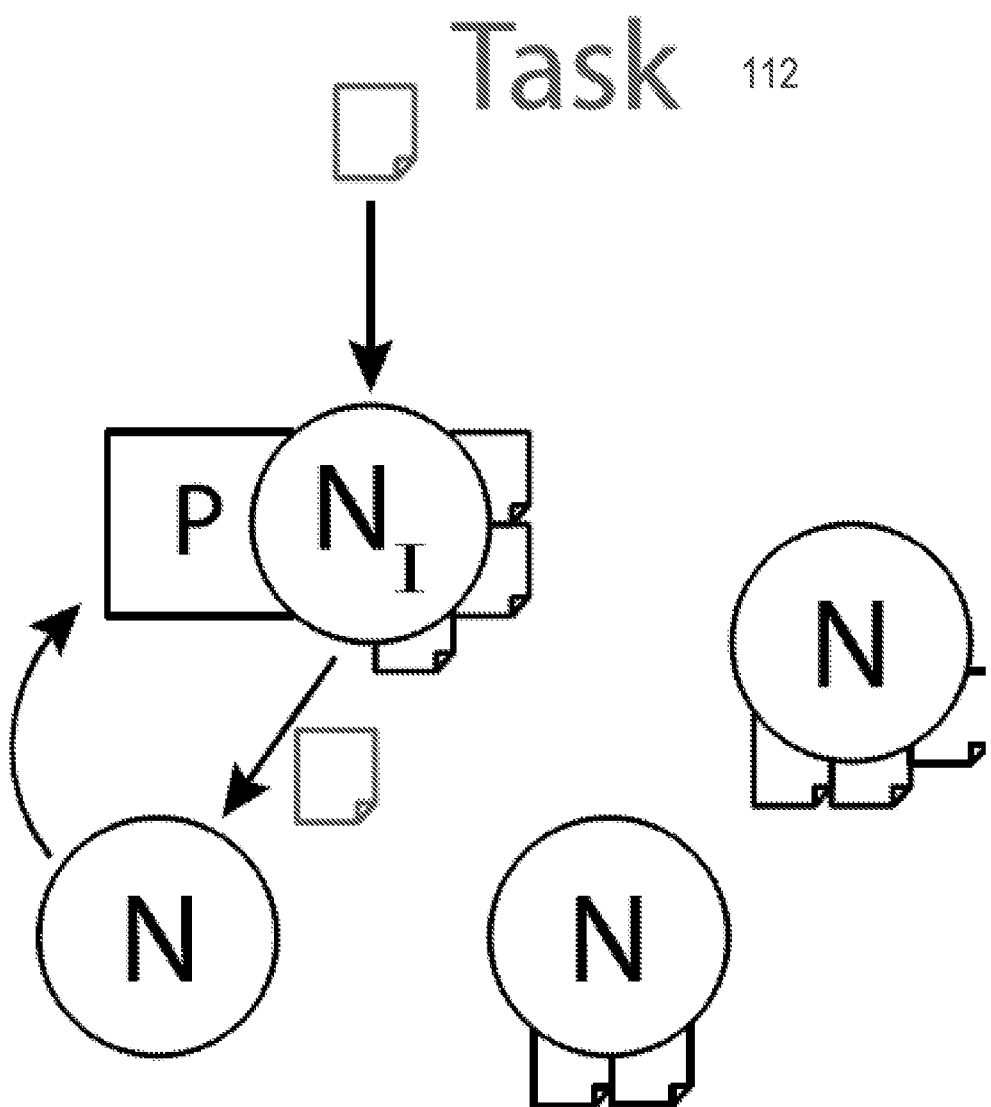
FIG. 8C is another illustration showing the allocation of jobs and tasks to nodes of a system, according to aspects of the present disclosure.
Figure 11:
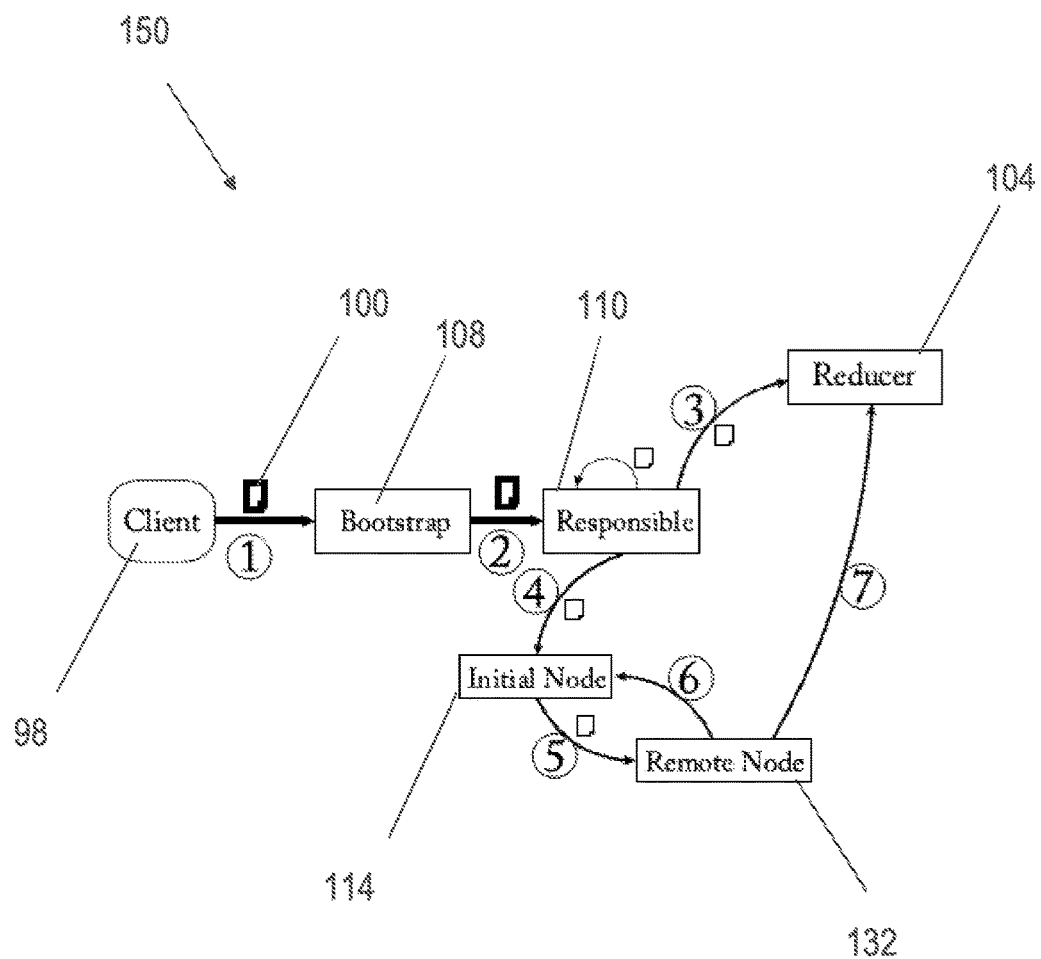
FIG. 11 is an illustration of an exemplary process flow, according to aspects of the present disclosure.

As shown in FIGS. 8A-8C, and further shown in FIG. 11, a job 100 may arrive via the MapReduce application 90 by client 98 at any node 20 in the P2P network 30, which becomes the originating job node 108 for that job 100. The job 100 defines an input file 62, a map function 92, a reduce function 94, and configuration parameters. The originating job node 108 simply forwards the job 100 to a random one of the three nodes in group 80 responsible for the first page 64 of the input file 62; this is the initial responsible job node 110 for the job 100. In some embodiments, the originating job node 108 is the same node as the originating data node 68 or the initial responsible data node 70.

One of the configuration parameters specified by the job 100 is the designation of a reporting node. The reporting node is the target for all status reporting from every task in the job and collects them in a log. If no reporting node is designated or specified, the initial responsible job node 110 can also be the reporting node.

The initial responsible job node 110 is responsible for delegating map tasks 112 and reduce functions 94 to appropriate nodes 20. The initial responsible job node 110 first selects a set of reducer nodes 104 ($R_1$, $R_2$, and $R_3$ in FIG. 8A) by generating reduce functions 94 with random IDs. The ID of each reduce function 94 is used to select the reducer nodes 104 and all reduce functions 94 are sent to their chosen reducer nodes 104.

Initial responsible job node 110 next creates one or more map tasks 112 containing the name of the input file 62, the index of the first page 64, and the list of chosen reducer nodes 104. In some embodiments, the order of reducer nodes 104 is consistent with all map nodes 114 so that the proper node is chosen for each map result. The one or more map tasks 112 is sent or delegated to a random one of three map nodes 114 responsible for the indicated page 64; this is the initial node $M_1$ for that task 112. This process of creating and sending map tasks 92 is repeated, incrementing the page index each time, until a map task 112 is sent for every page in the table of the file 62 ($M_1$, $M_2$, and $M_3$ in FIG. 8B). Thus, each map task 112 is initially delegated to map nodes 114, i.e., a random one of the nodes 20 bearing the map task's 112 corresponding page 64.

Prioritizing nodes that already have the appropriate data, called local nodes, increases locality by placing the map task 112 as close to its data as possible. If a node 20 does not have appropriate data stored locally, it is called a remote node and may execute the map task 112 after retrieving the appropriate data from a node 20 that has the appropriate data. This process is described in greater detail below according to scheduler 12.

Once all map tasks 112 have been delegated, the reducer nodes 104 are notified of each map task 112 of the map nodes 114 from which to expect results. In one embodiment, the reducer nodes 104 may process intermediate data as it is collected, but will not produce any output until all map tasks 112 have been completed. If any map task 112 does not complete in a predetermined time frame, the map task 112 can be restarted by one of the reducer nodes 104. The predetermined time frame should be carefully chosen to allow map tasks 112 to finish without waiting too long for stragglers, since no central node monitors the status of each task as is the case in conventional processing systems.

In one embodiment, the map function 92 specified by the map task 112 is concurrently applied to each element from the page 64 and the resulting elements are buffered using a buffer. When the buffer exceeds a predetermined size, the elements are flushed to the reducer nodes 104. In some embodiments, the target reducer node 104 for a key k is selected from the list of reducer nodes for the map task 112 at the position given by the hash of the key modulo the number of listed reducers. It is preferred that some of k maps to the same reducer node 104 at every node, so the ordering of the reducer node 104 list is maintained.

Figure 9:
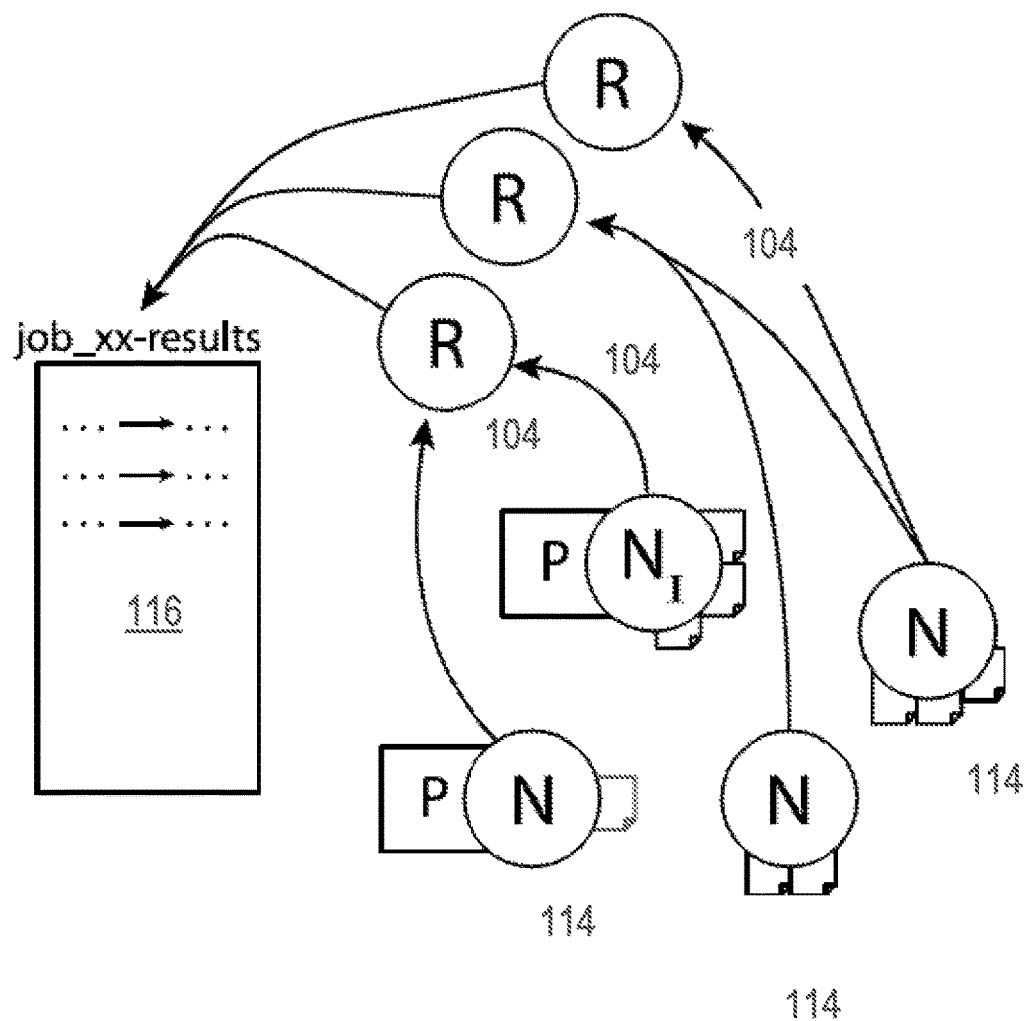
FIG. 9 is an illustration showing exemplary steps of performing map functions and reduce functions on a plurality of nodes for parallelizable computations and then sending results to an output file, according to aspects of the present disclosure.

When the input data has been exhausted, completion of the map task 112 is reported, along with the execution duration, to the reporting node and to the reducer nodes 104 as illustrated in FIG. 9. If anything interrupts the execution of a map task 112, the reducer nodes 104 will be notified that the map task 112 will be retried and the map task 112 is resubmitted to its initial responsible job node 110. The status of the map task 112 in this instance is reported with an additional value indicating the number of failures. If the reducer node 104 does not receive a successful completion or retry notification from a map task 112 within its predetermined window of execution, then the map task 112 is reported as lost and the reducer node 104 resubmits the map task 112 to the task's initial responsible job node 110.

A reducer node 104 is responsible for collecting all values for a particular key and may be responsible for numerous keys. These are represented as a one-to-many mapping from keys to values and are populated by intermediate results arriving from map tasks 112.

As further shown in FIG. 9, when all map tasks 112 have completed successfully, the status of the job 100 is reported as "reducing" and the reducer nodes 104 apply the reduce functions 94 to transform their one-to-many collection from one-to-one collections and produce an output file, e.g., job results 116. Each reducer node 104 then picks a random value, repeating until no two values are equal, and proceed in turn by lowest to highest value to commit their results to job results 116. Finally, the status of the job 100 is reported as "complete" with the name of the job results 116 and all map tasks 112 and reduce functions 94 performed by the reducer nodes 104 end.

In some embodiments, the reducer nodes 104 are not necessarily different nodes than map nodes 114. For example, if system 10 is implemented with three nodes 20 total, the map nodes 114 and the reducer nodes 104 can be the same nodes 20. However, reducer nodes 104 are selected from P2P network 30 differently and randomly each time a job 100 is processed which distributes the load of reduction evenly through the P2P network 30 (due in part to the random orientation of the P2P network 30 as described above). For each node 20 that is processing some task 112, before the map nodes 114 are generated, as the job is being processed, the reducer nodes 104 are all selected. In some embodiments, the map nodes 114 and reducer nodes 104 may be referred to as processing nodes.

In some embodiments, the map tasks 112 are distributed to all of the nodes 20 that have pages 64, and each map task 112 can be sent one at a time, such that if three nodes 20 have the same page 64, a map task 112 is sent to process that page 64 to only one of the three nodes 20. In other words, if there are duplicate copies of a page 64, only one copy is processed at a time. If that processing fails, the other remaining nodes 20 make a copy of the data from the failed node 20 and also take over the processing of the map task 112. The aforementioned steps can occur automatically according to system 10. In one embodiment, the map tasks 112 are preferably physically oriented nearby data or pages 64 that they refer to. If a computing device of IP network 18 has a certain piece of data to which a map task 112 refers, the map task 112 should be distributed to that computing device or a node 20 corresponding to that computing device. System 10 can ensure such steps automatically and inherently.

There are a number of ways to deal with failure of a reducer node 104. In some embodiments, each map node 114 can record the reducer nodes 104 to which it sends intermediate results. If a reducer node 104 fails, the first node to notice signals the initial responsible job node 110. The initial responsible job node 110 picks a new reducer node 104 and notifies each map node 114 of the failure and replacement. Those nodes that sent results to the lost node must restart their map tasks 112, only sending intermediate results that go to the replacement node. This method presents a number of challenges. Since the number of intermediate results vastly outnumbers the number of reducer nodes 104, it is likely that all map tasks 112 will have to restart. The time spent waiting for these map tasks 112 to run again presents greater opportunity for more reducer nodes 104 to become available, possibly creating a chain reaction of failing reducer nodes 104 and restarting of tasks.

The failure mode is a potential product of the map nodes 114 not storing the complete intermediate data set, but rather sending intermediate results to reduction as soon as they are available. They do this in an effort to increase the parallelism of map and reduce tasks, but a negative consequence is the transience of intermediate results. However, in one embodiment, map nodes 114 store intermediate results and reducer nodes 104 fetch them on task completion. Replacing reducer nodes 104 in such a manner is relatively cheap, but each map node 114 incurs a storage load proportional to the amount of data it processes.

In a further embodiment, the system 10 makes intermediate results first-class data and distributes the first-class data in the same manner as file pages 64. In the reduction phase, the initial responsible job node 110 would select a random one of the replicated nodes for each of intermediate data and assign it a reduction function 94. Map task 112 results would be made robust and successful map tasks 112 would not have to be restarted. Reduction failure would affect only one set of intermediate results and replicates for those results would be immediately available. In this manner, robustness would be generated at the cost of extra replication, but in a volatile network, the savings of partial results may mean the difference between an available system and jobs never finishing.

In one sample process flow, during task execution, a client 98 picks any node 20, uploads data, uploads a map function, and uploads a reduction function 94. The client 98 then submits that information, generally in the form of a job 100, to an originating data node 68. The originating data node 68 picks initial responsible data nodes 70 for each page 64 and delivers those pages 64 to the initial responsible data nodes 70. Each of the initial responsible data nodes 70 picks, if overloaded, the next closest node to give that page to. The map tasks 112 are delivered to one of the nodes 20 that has each page 64 and then the nodes 114 execute a map task 112, report to the reducer nodes 104, and the reducer nodes 104 create a table in the database 198 with the results as generated from the reducer nodes 104.

The job 100 may also specify a reporting node which receives updates on the job's status. Because of the lack of central control, the reporting information is pushed to the reporting node instead of being pulled by the reporting node since the reporting node may not know where the tasks are executed.

In one embodiment, atop, the DFS 14, a NoSQL database 198 (FIGS. 13 and 14) is constructed that maps serializable keys to serializable values. The serializable type scheme can be code-compatible with Hadoop's Writable interface and enables the storage of arbitrary key and value types in the database.

In one embodiment, data input is further defined as follows. The conversion of arbitrary data to a transmissible format for the database 198 is performed by a data-specific transformer. A transformer reads data in its input format and produces serializable key→value pairs that can be added to the database 198. Arbitrarily formatted data can be entered into the database with a data source D by composing the database client C, a transformer T, and a data reader R as C ∘ T ∘ R. Data F can then be entered by applying D(F).

In one embodiment, storage within DFS 14 is further defined as follows. The database 198 is divided into collections of key→value pairs called tables, each table representing a separate file in the DFS 14. The database client is aware of the size of pages 64 in the files and signals to DFS 14 to flush partially full pages such that elements are not split between two pages; in doing so it ensures that each node 20 has local access to a complete and valid subset of the table. The page 64 is prepended with an index of the keys in natural order and their byte offsets before writing.

In some embodiments, indexing is further defined as follows. To achieve total decentralization, the database 198 does not depend on centralized metadata or tracking nodes. The database 198 can rely on the contiguous naming of a file's pages 64 to ensure that all elements in the database 198 can be enumerated without an index. Because of the page's contiguity, however, and because keys can be added in any order, retrieving a key is an O(n) operation. For high retrieval performance expected of a NoSQL database some index of keys should be made.

The key index can be implemented as a set of binary trees, each rooted by the index of a particular page; each tree contains the 32 bit hashes of keys stored in that page. The key index for a page 64 is distributed with that page 64, but is independent from the page itself.

Nodes 20 storing pages 64 of a database table periodically replicate their key indices so that all nodes 20 aware of a particular table have a copy of the key index for each page of the table's file. Key lookup involve searching each tree for the hash of the key in question an O(m log n) operation where m is the number of pages and n is the number of keys per page.

In some embodiments, additional operations of DFS 14 are defined as follows. The database client first retrieves the size of the last page of the table; if adding the new value to the page would exceed its size, then the client opens the file in the append mode and adds the key to a new page, otherwise, the client retrieves the last page and appends the new key→value pair to it, updating the table file with the replace operation. The key index for the modified page is updated and provided to the node 20 receiving the page; that node is responsible for replicating the index to all other nodes aware of the table file. The DFS 14 lock is obtained for the page being modified to prevent parallel modification.

A batch put operation can involve adding many keys at once to amortize the setup costs involved in adding a key. Batch put is not concurrent with put; instead of locking an individual page, the client takes out a database-specific lock on the entire table file. The client opens the table file in append mode and adds new elements, generating key indices as pages are added to the table file with pages being distributed their concomitant indices.

A get operation involves, for a given key, the client retrieving the key index and retrieving all pages containing the key. A binary search of each page's offset index locates the key in the page and its value is read. The values are collected into a set and returned as a key→value set pair. The get operation is atomic per page, that is, a page will not be modified while it is being read, but it may be modified immediately before or after; additionally, if a key exists on multiple pages, then the one page may be modified while another is being read.

Task Scheduling

In one embodiment, the task scheduler 12 is a scheduler, data-load balancer, or queue-based scheduler that uses a scheduler algorithm to achieve optimal backpressure forwarding. As previously discussed, with system 10, reduce functions 94 are randomly assigned to reducer nodes 104. The map tasks 112 are dispatched in a distributed fashion to map nodes 114 based on local information to balance the load across the P2P network 30 and to improve locality. Task scheduler 12 further ensures the map tasks 112 are distributed to fully optimize data load across the nodes 20 of the P2P network 30.

Figure 10A:
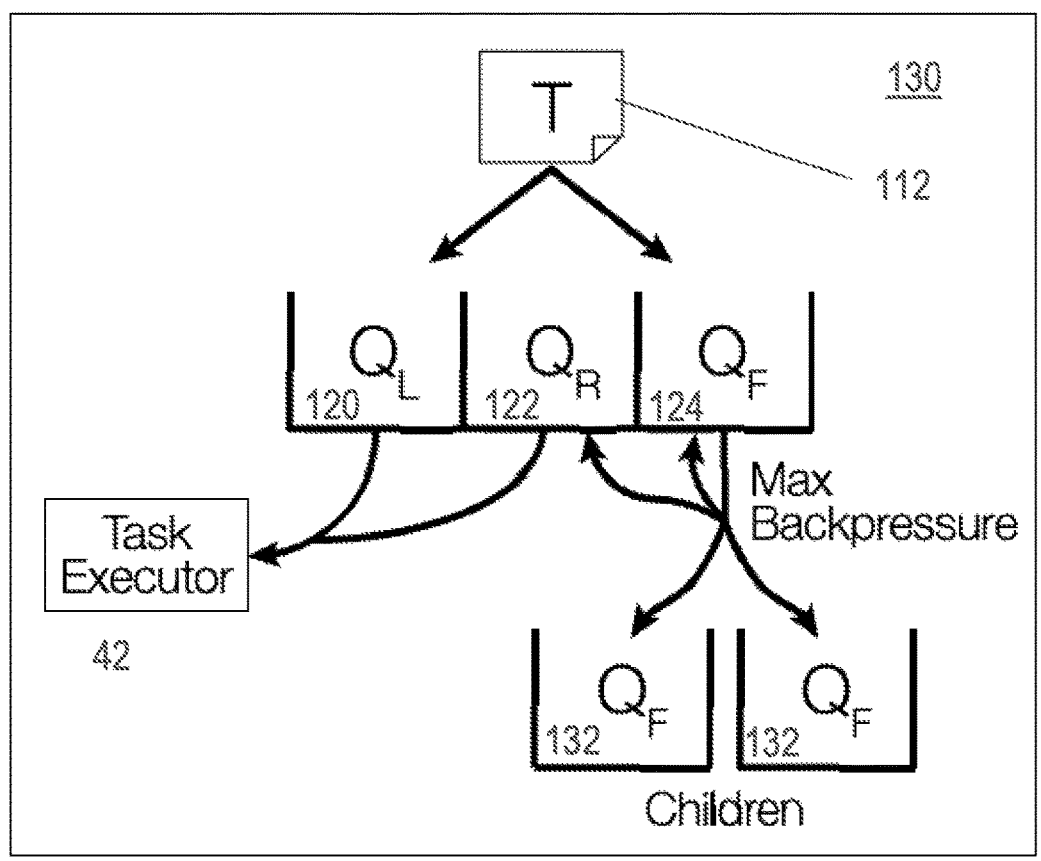
FIG. 10A is an illustration showing the use of a task scheduler to balance processing load across a network, according to aspects of the present disclosure.
Figure 10B:
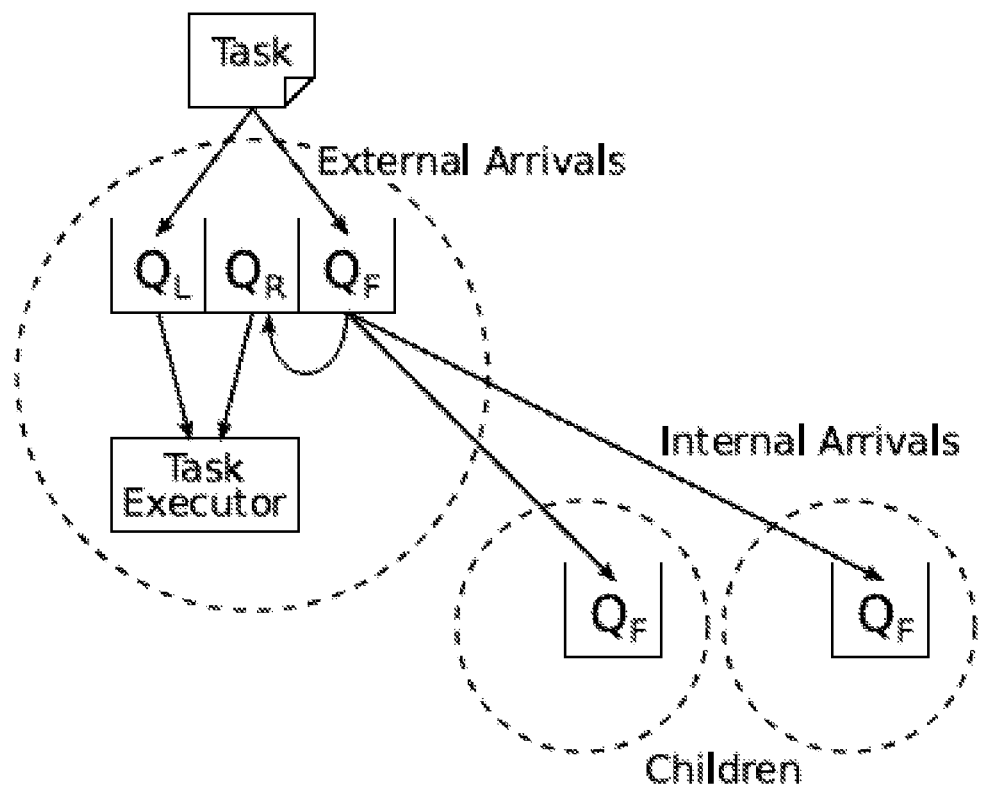
FIG. 10B is another illustration showing the use of a task scheduler to balance processing load across a network, according to aspects of the present disclosure.

As shown in FIGS. 10A-10B, the following approach may be implemented for the map task 112 scheduling that utilizes task scheduler 12. Each node 20, or in the examples provided in FIGS. 10A-10B, node 130, maintains three queues for map tasks 112: a local queue 120 which may be represented as $Q_n^L$, a remote queue 122 which may be represented as $Q_n^R$, and a forwarding queue 124 which may be represented as $Q_n^F$, where the local queue 120 contains map tasks 112 which reference a page 64 stored on the node 130, while the map tasks 112 in the remote queue 122 must fetch their input page 64 from a remote node 132. The map tasks 112 in the local queue 120 and remote queue 122 will be processed by node 130. The forwarding queue 124, or $Q_n^F$, stores map tasks 112 that will be further delegated.

Map tasks 112 that are newly created and sent to node 130, which is their initial node, can be considered external arrivals to node 130, while tasks that are forwarded to node 130 by its neighbor nodes can be considered internal arrivals. External arrivals are either accepted into local queue 120 ($Q_n^L$) for local processing or stored in the forwarding queue 124 ($Q_n^F$) Internal arrivals are all first put into the forwarding queue 124 ($Q_n^F$). Since map tasks 112 in the forwarding queue 124 ($Q_n^F$) are map tasks 112 that cannot receive immediate and local processing, they are all viewed as remote map tasks 112 for node 130 for simplicity. Then, the forwarding queue 124 can decide whether the map tasks 112 should be processed by node 130 or further forwarded to neighbor nodes of node 130 such as remote nodes 132.

In one embodiment, the scheduler algorithm is specifically described as set forth in the following Table 1.

TABLE 1

The incoming external arrivals of map tasks at node n are routed to the shortest queue in $\{Q_n^P, Q_n^L\}$ at each time slot. For each node n, we consider the connections between the forwarding queue $Q_n^F$ and the queues in $\{Q_n^P, Q_n^R\} \cup \{Q_k^F : k \in \mathscr{E}_n\}$ as logical links. Define the backpressure of these links at time slot t as $$w(Q_n^F(t), Q_n^F(t)) = 0, \quad (1)$$
$$w(Q_n^P(t), Q_n^R(t)) = Q_n^P(t) - Q_n^R(t), \quad (2)$$
$$w(Q_n^P(t), Q_k^P(t)) = Q_n^F(t) - Q_k^F(t), k \in \mathscr{E}_n. \quad (3)$$

Then one map task in $Q_n^F$ (if there is any) is routed to the queue in $\{Q_n^P, Q_n^R\} \cup \{Q_k^F : k \in \mathscr{E}_n\}$ with the maximum backpressure at each time slot. Note that if this queue is $Q_n^L$ at some time slot, then it means no task is forwarded out from $Q_n^P$ as this time slot. For each node n, we consider the connections between the queues in $\{Q_n^L, Q_n^R\}$ and the processor of node n as logical links. Define the backpressure of these links at time slot t as $$w(Q_n^L(t), n) = \alpha Q_n^L(t), w(Q_n^R(t), n) = \gamma Q_n^R(t), \quad (4)$$

where $1/\alpha$ is the average service time for a local map task and $1/\gamma$ is the average service time for a remote map task. If a node just finished a map task at time slot t − 1, we say the node is available at time slot t, and otherwise the node is busy since it must be serving some map task. Then at each time slot, if node n is available, it is scheduled to serve a task from the queue in $\{Q_n^L, Q_n^R\}$ with maximum backpressure: otherwise node n continues serving its unfinished map task, i.e., the execution of map tasks is nonpreemptive.

In sum, the task scheduler 12 finds the optimal worker (node) to execute a given map task 112 such that the task scheduler 12 distributes map tasks 112 to the least busy of task processors of P2P network 30. The task scheduler 12 operates by asking, each time a map task 112 arrives at a first node, who, among me (the first node) and the nodes closest to me is the least busy? To answer that question, each node 20 maintains three lists of tasks: one the worker is ready to execute (local queue 120), one with tasks to be executed pending more information (remote queue 122), and one for tasks that the worker won't do (forwarding queue 124). Tasks in the forwarding queue 124 may be moved to the first two queues if the node 20 becomes less busy. Otherwise, tasks in the forwarding queue 124 are transmitted to neighboring nodes 20 or remote nodes 132.

Exemplary Process Flows

FIG. 11 provides one exemplary process flow 150 for processing and scheduling of data processing within a P2P network 30 according to aspects of the present disclosure. In Step 1, a client 98 delivers a job 100 to any node 20 in the P2P network 30. In step 2, a bootstrap node or originating job node 108 receives the job 100 from client 98 and forwards the job 100 to an initial responsible job node 110. In step 3, the initial responsible job node 110 selects reducer nodes 104 and notifies them of map tasks 112. In step 4, the initial responsible job node 110 delegates the map tasks 112 to the initial nodes or map nodes 114. In some embodiments, the initial responsible job node 110 is also the initial node or one or more map nodes 114. In step 5, the initial responsible job node 110 forwards map tasks 112 to its neighbors or remote nodes 132. In step 6, a remote node 132 retrieves the page 64 for its remote map task 112. In step 7, the remote node 132 executes the map task 112 and delivers intermediate results to the reducer nodes 104.

Figure 12:
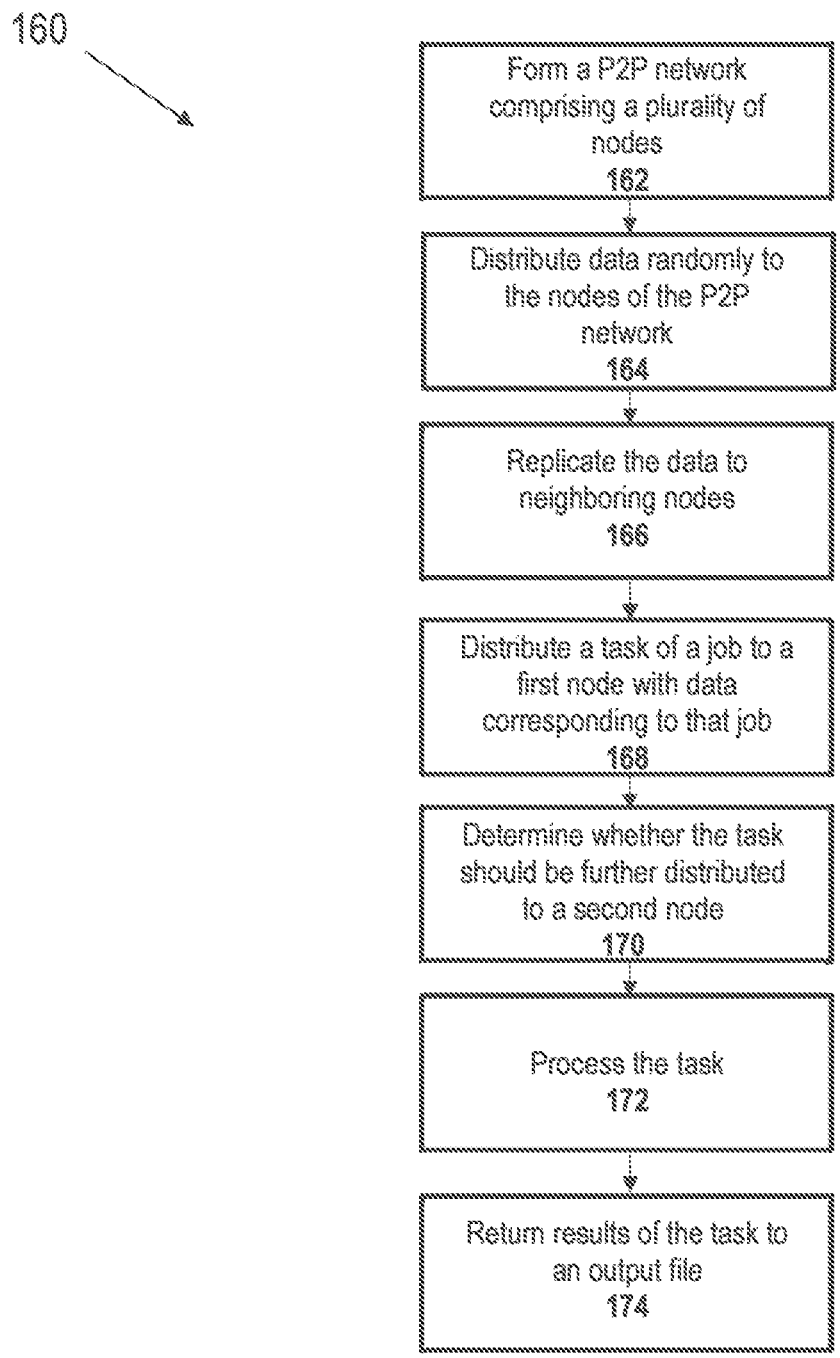
FIG. 12 is an illustration of another exemplary process flow, according to aspects of the present disclosure.

FIG. 12 illustrates another exemplary process flow 160 for utilizing system 10. In step 162, P2P network 30 is formed comprising a plurality of nodes 20. In step 164, data (pages 64 derived from files 62) is distributed randomly to the nodes 20 of the P2P network 30. In step 166, the data is replicated to neighboring nodes 20 as shown in FIG. 6. In step 168, a task 112 derived from a job 100 is distributed to a first node of the plurality of nodes 20 where the first node of the plurality of nodes 20 has access to data corresponding to the job 100 and task 112. In step 170, scheduler 12 of system 10 determines whether the task 112 should be further distributed to a second node of the plurality of nods 20. In step 172, the task 112 is processed (by, in some embodiments, one or more reduce nodes 104 and one or more map nodes 114). In step 174, the results of the task 112 are returned to an output file for display to a client 98.

In sum, the system 10, using DFS 14, determines how data is allocated across P2P network 30 in pages 64 and also determines which of the nodes 20 of P2P network 30 will perform map tasks 112 corresponding to the data and pages 64. Task scheduler 12 of system 10 optimizes task and load processing by analyzing the status of individual nodes 20 and allocating tasks to other nodes 20 where necessary to reduce overloading of individual nodes 20 and to make use of nodes 20 that could take on additional load. Each of the nodes 20 of the P2P network 30 participate in task delegation in contrast to conventional top-down node or master/slave node configurations. Roles are distributed evenly about the P2P network 30 so that data storage, data and job tracking, and task processing are fully decentralized.

Any node 20 in the P2P network 30 may not only act as a map node, reducer node, or processing node, or storage node, but may also delegate those functions to any other node 20; thus, no authoritative node exists for any of these functions and no node 20 has disproportionate responsibility in managing the P2P network 30. Decentralizing authority eliminates vulnerability hotspots in appropriately-configured networks without requiring the expense of backup master nodes; in essence, the entire network comprises the backup master nodes.

Of the individual nodes 20 in the P2P network 30, no one node 20 is expected to participate more or less than the other nodes 20. Individual hardware specifications are not particularly important then, so long as individual units of load are sufficiently small. In other words, storage hardware for the IP network 18 can be low cost storage and processing hardware can also be provided with a reduced budget so long as load and data distribution is adequately balanced across the P2P network 30. A low-value computing device may represent a single node in the P2P network 30 and could receive a small number of storage and processing loads. A high-value machine may conversely represent a larger number of nodes 20. Each may receive the same small loads, but in sum representing a larger portion of the network load. The P2P network 30 applications can thereby make use of existing physical networks with disparate machine capabilities. Expensive high-capacity computing devices can be reassigned to other applications to eliminate physical hot spots in the P2P network 30 to decrease denial-of-service vulnerability.

System 10 provides robustness. The ideal topology for maximizing the qualities of decentralization and agnosticism comprises a large number of physically decentralized machines or computing devices each representing a single node in the network. Data replication and job distribution in such a network ensures that multiple copies of all important information exist across various physical and administrative domains.

System 10 improves scalability. Dispersing role delegation authority to every node 20 makes the P2P network 30 effectively unaware of its limited size. Each node 20 can be willing to ask any other node 20 to assume some role, and that node 20 should be willing to accept. The node discovery protocol does not require prior knowledge of a node for it to be the target of delegation, so newly introduced nodes 20 are welcomed to the P2P network 30 as if they were always there. The result is increased quality of service and decreased load on the existing network when new machines are introduced. Additionally, untapped resources of an existing machine may be introduced to the P2P network 30 simply by adding more nodes 20 to that machine. Because no node 20 is completely responsible for any of its charge, the P2P network 30 can be scaled back seamlessly by gradually removing nodes 20. Nodes 20 sharing responsibility for a job or data can constantly ensure that responsibility is shared to a minimum degree and will automatically recover from lost network capacity.

Performance Analysis

System 10 was prototyped and tested in processing a set of large English text documents as reflected in FIGS. 16-20. The prototyping environment comprised up to eight identical machines, each with four Intel® Xeon® CPU 1.8 GHz E5-2603 and 7828 MB total RAM, all connected by 1 Gbps Ethernet links.

Figure 15:
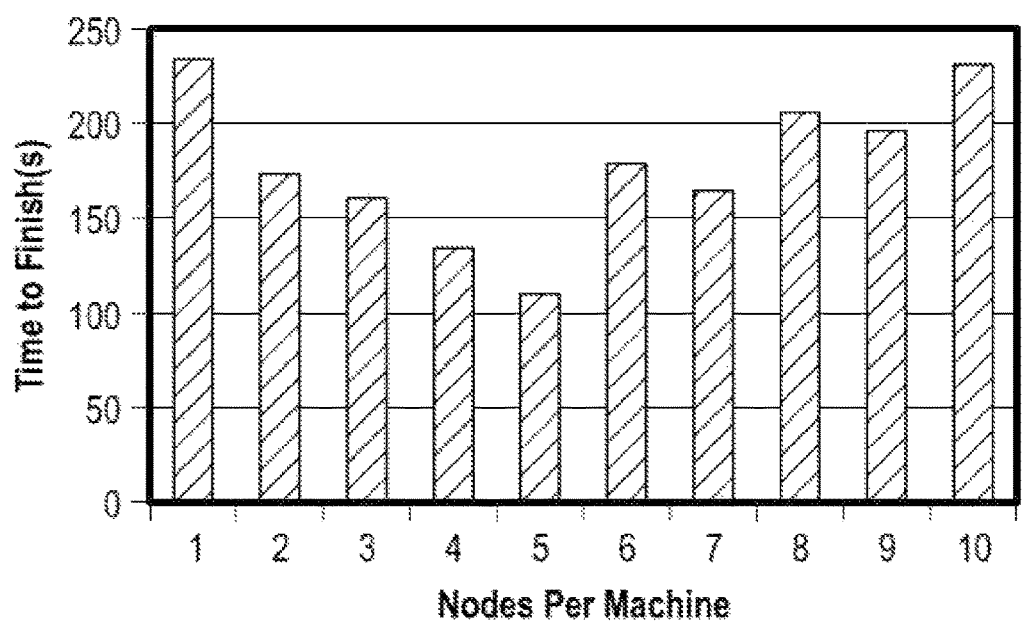
FIG. 15 is an illustration showing the results of processing ten 1 GB parallel jobs in 256 MB pages on eight machines with a varying number of nodes per machine, according to aspects of the present disclosure.

Nodes per machine: Each machine or computing device can support a theoretically unbounded number of nodes 20, but because nodes 20 are not particularly light-weight the cost of context switching can overwhelm the benefit of adding nodes 20. The number of nodes 20 per machine was increased and measured with the total processing time for several parallel jobs. It was found that an ideal configuration is where the number of nodes 20 approximated the number of processors on each machine (FIG. 15). Major improvements can be made to the per-machine node performance by adopting a more lightweight model for local nodes 20. Increasing the number of nodes 20 per machine circumvents decentralization, however, so a large number of nodes 20 per machine is not necessarily ideal.

Figure 16:
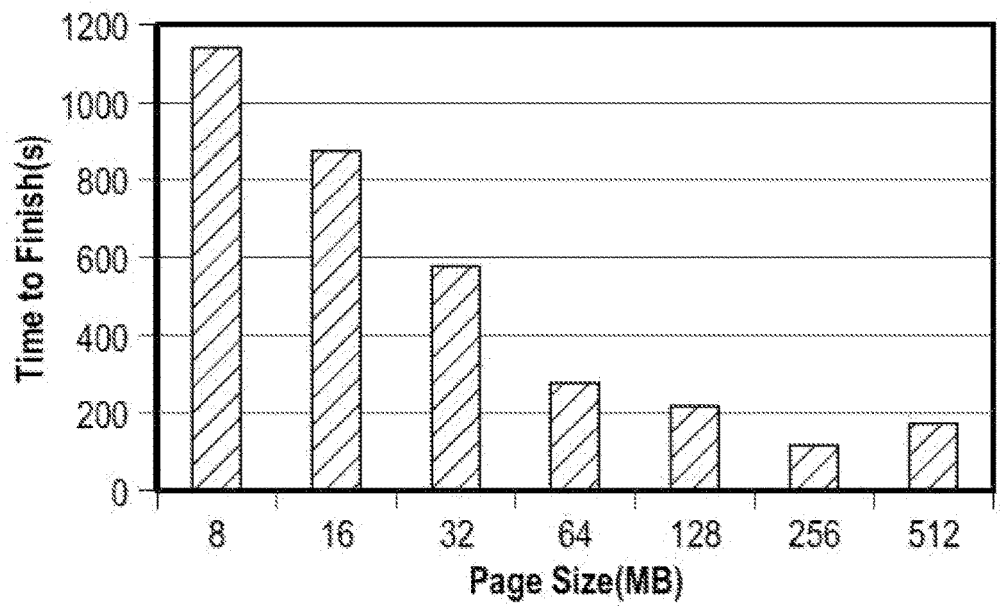
FIG. 16 is an illustration showing the results of varying the page size for ten 1 GB parallel jobs on eight machines with five nodes each, according to aspects of the present disclosure.

Page size: Selecting the optimal page size depends largely on the network and processor characteristics, the number of nodes 20 available, and the size of the input data. Both larger or smaller pages 64 have trade-offs in terms of speed and robustness: page sizes should be sufficiently small that transfer times are minimized, ensuring rapid replication, but should be large enough to make maximum use of each machine's processing capacity so that network costs do not dominate execution time. This parameter could be determined dynamically to accommodate changing machine profiles and could potentially be individualized for specific machines, but in the tested implementation it was set on a per-file basis. FIG. 16 illustrates the performance trend wherein excessively small pages 64 produce huge numbers of map tasks 112 that take longer to set up than to process; conversely, increasing page size amortizes the set up cost until the tasks are too few to benefit from concurrency.

Figure 17:
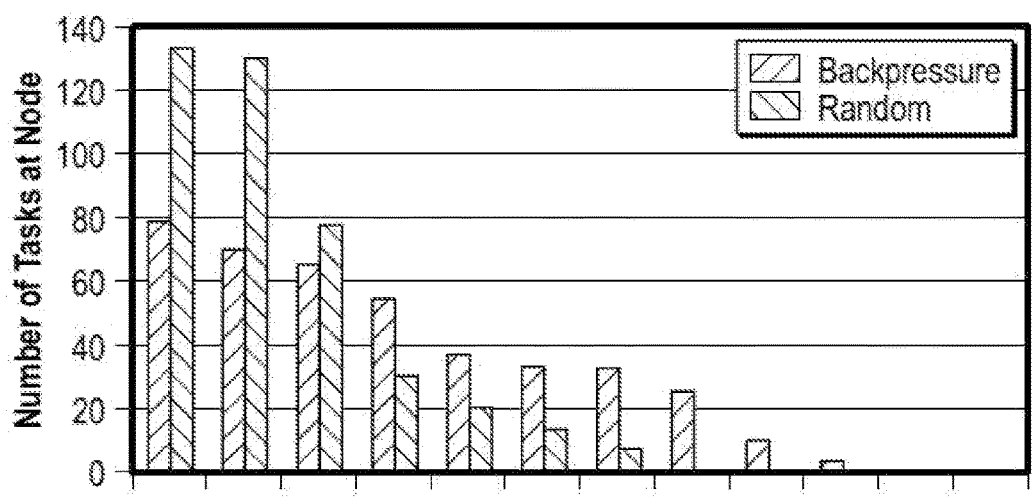
FIG. 17 is an illustration showing nodes compared to tasks per node, the results of backpressure versus random task scheduling, and that the scheduler reduces the maximum number of tasks per node and distributes tasks to more nodes overall, according to aspects of the present disclosure.
Figure 18:
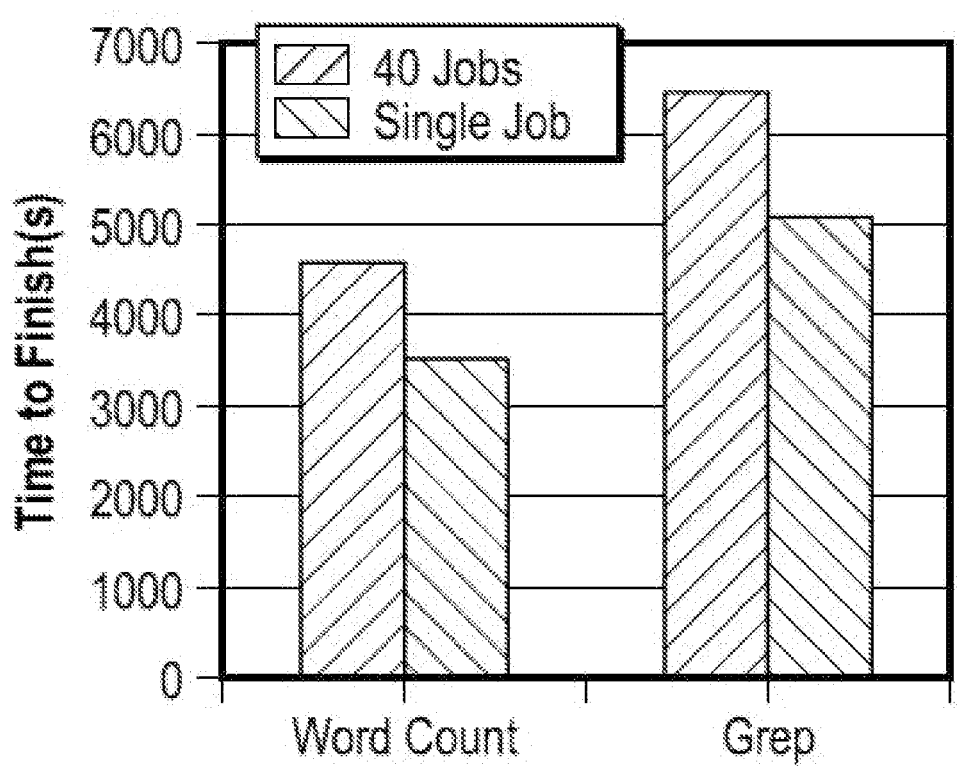
FIG. 18 is an illustration showing various jobs versus the time to finish jobs and that running forty jobs in parallel incurs on average 23% time overhead as compared with a single job, according to aspects of the present disclosure.

Load balancing: The intended effect of the backpressure scheduler 12 is to eliminate hotspots of task processing by diffusing tasks among the local neighborhoods of their originally-assigned nodes 20. The balancing effect of the backpressure scheduler 12 was examined by comparing against a random scheduler; that is, one which randomly assigns each task to a node and does no further distributing. An even distribution of tasks per node, with no significant peaks, is considered to be effectively load balanced. FIG. 17 shows that, while not perfectly even, task scheduler 12 makes more complete use of the available nodes 20 and reduces the load on each node 20 relative to random scheduling.

Processing rate: Each phase of processing presents a separate set of complexities and costs and therefore separate opportunities for optimization. For the initial prototype, the focus of the analysis was on the total output of the system; that is, the rate of completed results produced by the entire system including all concurrently running jobs. Optimizing each phase individually for efficiency and robustness presents a large body of further work in developing a high-performance processing environment.

Figure 19:
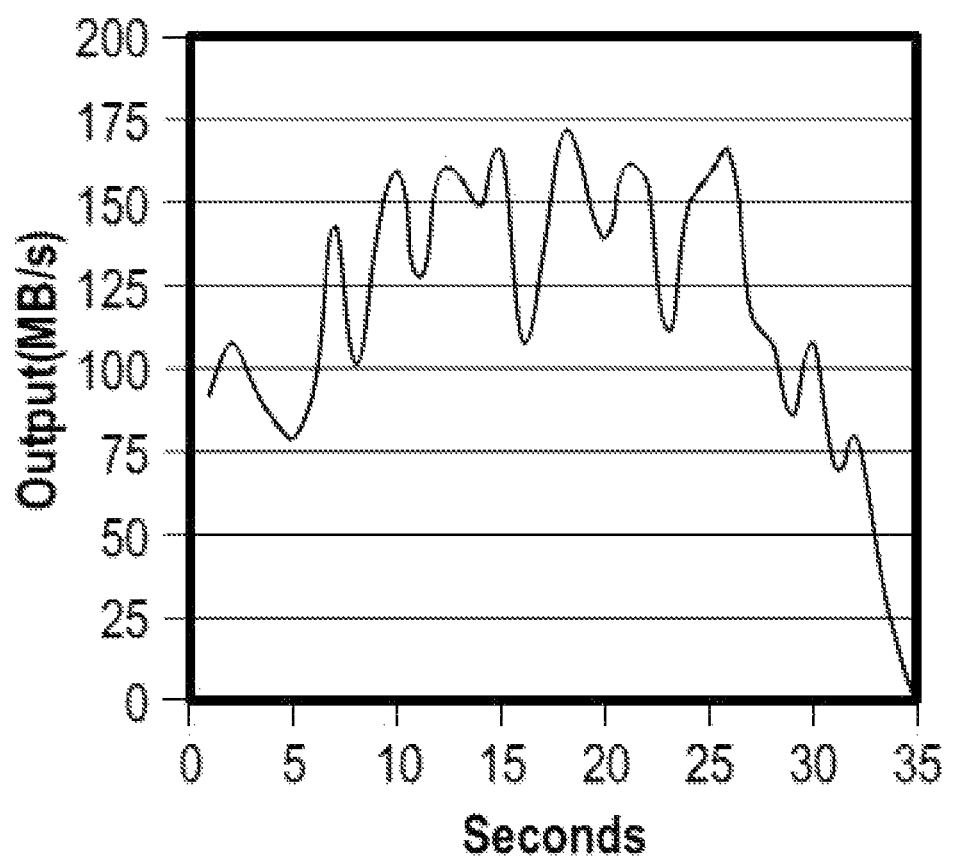
FIG. 19 shows rate of result output for four 1 GB jobs in parallel across forty nodes, according to aspects of the present disclosure
Figure 20:
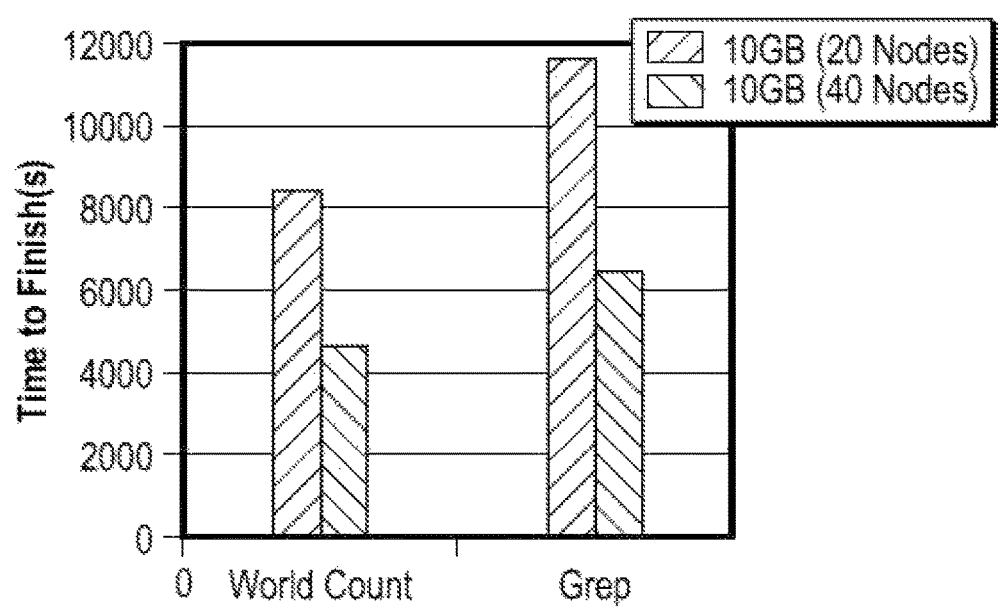
FIG. 20 shows processing duration for two operations on forty parallel jobs, each with 10 GB of input data.

FIG. 19 shows the total rate of result output from four concurrent word-counting jobs on 1 GB of input data across forty nodes 20. The initial output rate is high as initial task delegation occurs quickly. By ten seconds the maximum rate is achieved, reflecting the period during which map tasks 112 are forwarded to the next available nodes for execution. The maximum rate (maximum system utilization) is maintained for approximately 42% of the total run time, followed by a steep decline in utilization as most tasks are completed simultaneously. The average output of each node during this time is 2.9 MB/s.

In evaluating the system's performance with larger datasets a grep operation was implemented in addition to the aforementioned word-count. This operation matches a specified regular expression against the input data and returns the number of matches. The processing duration of the two job types, given forty parallel jobs of 10 GB input data each (400 GB total per operation), can be seen in FIG. 20.

The system 10 in the aforementioned implementation is but one embodiment and a prototype only and is not optimized for performance; nevertheless it appears from these results to make efficient use of available resources, responding to a doubling of compute resources by halving compute time. Performance optimizations would certainly reduce the overhead imposed by each node and improve throughput.

Overall, the peer-to-peer architecture of system 10 offers benefits to robustness, scalability, and reduced administrative cost over hierarchical networks. System 10 represents a fully decentralized P2P which may use a MapReduce application 90 with a fault-tolerant distributed file system 14 and an adaptive centrality-optimizing task scheduler 12. Divorcing MapReduce from centralized control allows system 10 to offer broad scalability over varying network topologies and to practically eliminate service unavailability by distributing responsibility among peers. While the focus of system 10 is on a decentralized environment, some benefits may be had by being open to a hybrid net-work consisting of centralized and decentralized components which is contemplated in some embodiments of the present disclosure. Security considerations, for example, may prohibit truly decentralized sharing of responsibility for certain roles. Experiments with an exemplary implementation of system 10 demonstrate that the system behaves as expected of a parallel processing platform.

Figure 13:
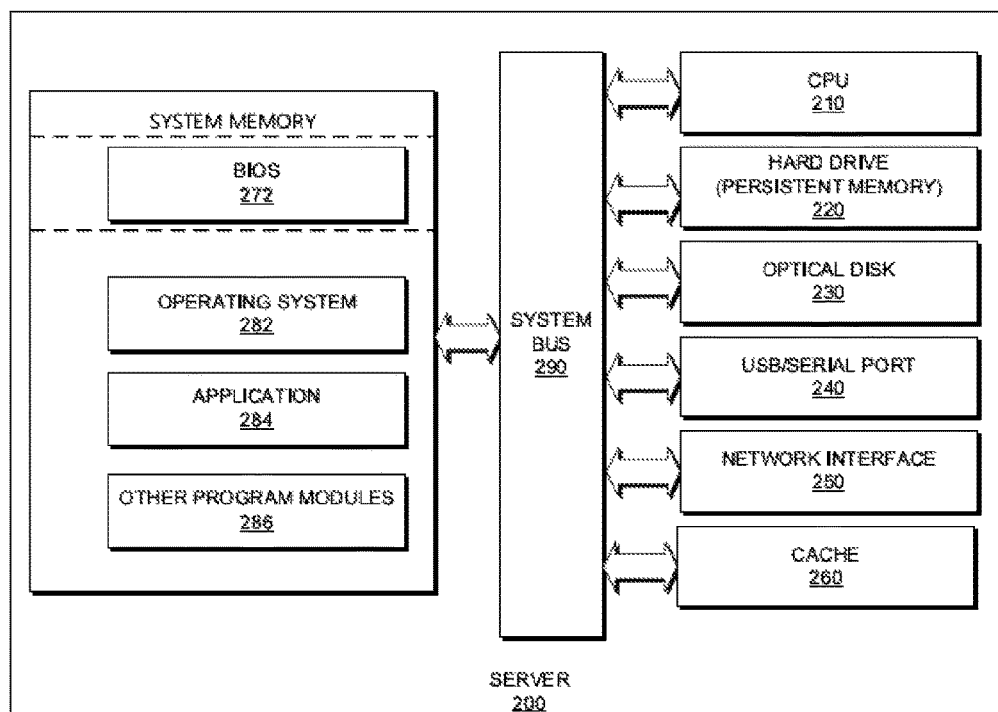
FIG. 13 is an illustration of a computing system, according to aspects of the present disclosure.

Returning to FIG. 13, the figure illustrates an example general purpose computer 200 that may be useful in implementing the described systems (e.g., nodes and computing devices within the P2P network 30, physical network, 18 and/or the overall system 10). The example hardware and operating environment of FIG. 13 for implementing the described technology includes a computing device, such as general purpose computing device in the form of a personal computer, server, or other type of computing device. In the implementation of FIG. 13, for example, the general purpose computer 200 includes a processor 210, a cache 260, a system memory 220 and a system bus 290 that operatively couples various system components including the cache 260 and the system memory 220 to the processor 210. There may be only one processor 210 or there may be more than one processor 210, such that the processor 210 of the general purpose computer 200 comprises a single central processing unit (CPU), or a plurality of processing units, commonly referred to as a parallel processing environment. The general purpose computer 200 may be a conventional computer, a distributed computer, or any other type of computer; the disclosure included herein is not so limited.

The system bus 290 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) and random access memory (RAM). A basic input/output system (BIOS), containing the basic routines that help to transfer information between elements within the general purpose computer 200 such as during start-up may be stored in ROM. The general purpose computer 200 further includes a hard disk drive 220 for reading from and writing to a persistent memory such as a hard disk, not shown and an optical disk drive 230 for reading from or writing to a removable optical disk such as a CD ROM, DVD, or other optical medium.

The hard disk drive 220 and optical disk drive 230 are connected to the system bus 290. The drives and their associated computer-readable medium provide nonvolatile storage of computer-readable instructions, data structures, program engines and other data for the general purpose computer 200. It should be appreciated by those skilled in the art that any type of computer-readable medium which can store data that is accessible by a computer, such as magnetic cassettes, flash memory cards, digital video disks, random access memories (RAMs), read only memories (ROMs), and the like, may be used in the example operating environment.

A number of program engines may be stored on the hard disk, optical disk, or elsewhere, including an operating system 282, an application 284, and one or more other application programs 286. A user may enter commands and information into the general purpose computer 200 through input devices such as a keyboard and pointing device connected to the USB or Serial Port 240. These and other input devices are often connected to the processor 210 through the USB or serial port interface 240 that is coupled to the system bus 290, but may be connected by other interfaces, such as a parallel port. A monitor or other type of display device may also be connected to the system bus 290 via an interface (not shown). In addition to the monitor, computers typically include other peripheral output devices (not shown), such as speakers and printers. Finally, database 198 may be operatively coupled to computer 200 and may reside in part on hard drive 220, optical disk 230, and in cache 260.

The embodiments of the present disclosure described herein can be implemented as logical steps in one or more computer systems. The logical operations of the present disclosure can be implemented (1) as a sequence of processor-implemented steps executing in one or more computer systems and (2) as interconnected machine or circuit engines within one or more computer systems. The implementation is a matter of choice, dependent on the performance requirements of the computer system implementing aspects of the present disclosure. Accordingly, the logical operations making up the embodiments of the disclosure described herein are referred to variously as operations, steps, objects, or engines. Furthermore, it should be understood that logical operations may be performed in any order, unless explicitly claimed otherwise or a specific order is inherently necessitated by the claim language.

Figure 14:
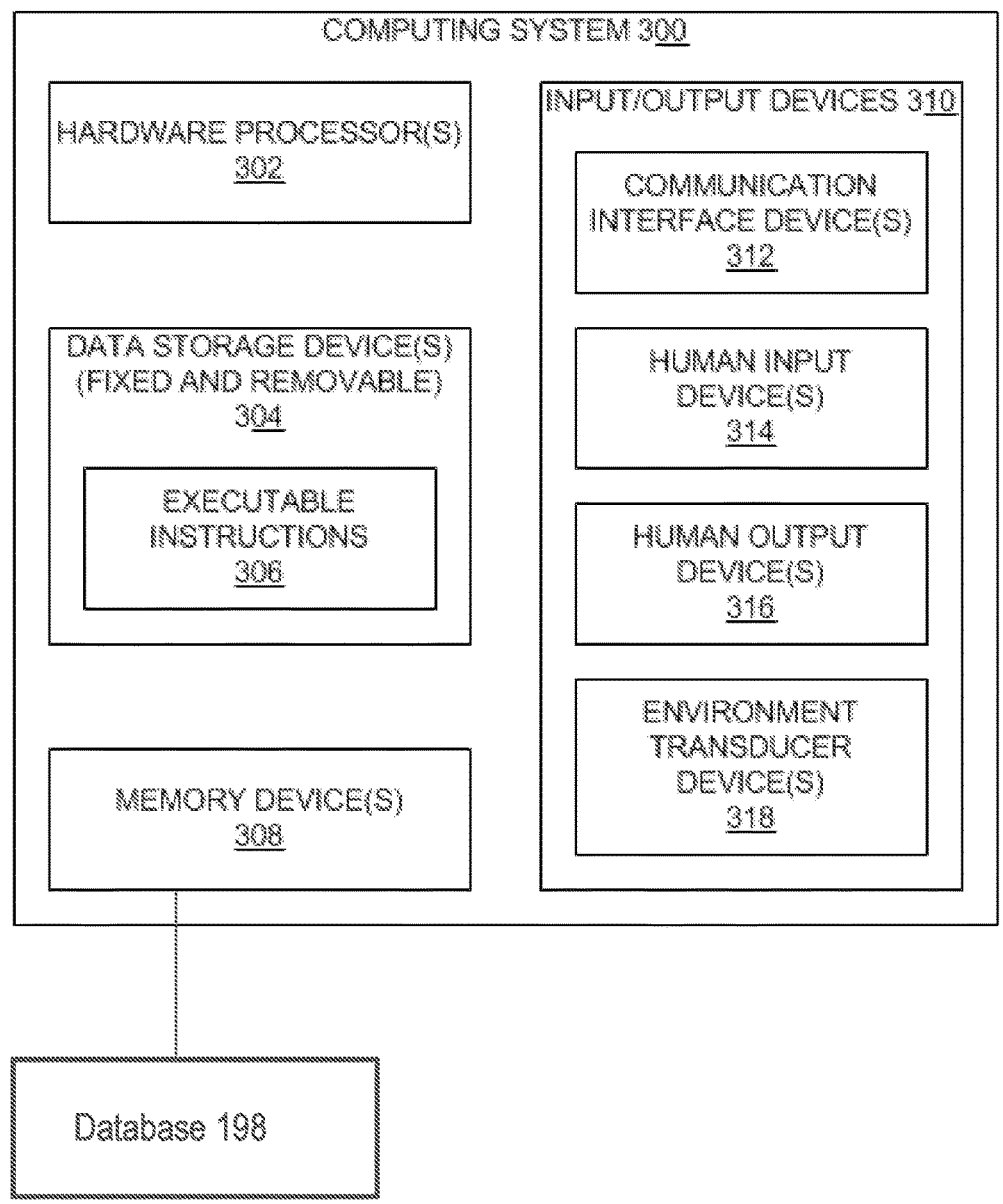
FIG. 14 is an illustration of an alternate computing system, according to aspects of the present disclosure.

FIG. 14 illustrates another embodiment of a computing system 300 that may be useful in implementing the described systems (e.g., nodes and computing devices within the P2P network 30, physical network, 18 and/or the overall system 10). Example embodiments described herein may be implemented at least in part in electronic circuitry; in computer hardware executing firmware and/or software instructions; and/or in combinations thereof. Example embodiments also may be implemented using a computer program product (e.g., a computer program tangibly or non-transitorily embodied in a machine-readable medium and including instructions for execution by, or to control the operation of, a data processing apparatus, such as, for example, one or more programmable processors or computers). A computer program, which may include DFS 14 or task scheduler 12 (or combination of the two), may be written in any form of programming language, including compiled or interpreted languages, and may be deployed in any form, including as a stand-alone program or as a subroutine or other unit suitable for use in a computing environment. Also, a computer program can be deployed to be executed on one computer, or to be executed on multiple computers at one site or distributed across multiple sites and interconnected by a communication network.

Certain embodiments are described herein as including one or more modules. Such modules are hardware-implemented, and thus include at least one tangible unit capable of performing certain operations and may be configured or arranged in a certain manner. For example, a hardware-implemented module may comprise dedicated circuitry that is permanently configured (e.g., as a special-purpose processor, such as a field-programmable gate array (FPGA) or an application-specific integrated circuit (ASIC)) to perform certain operations. A hardware-implemented module may also comprise programmable circuitry (e.g., as encompassed within a general-purpose processor or other programmable processor) that is temporarily configured by software or firmware to perform certain operations. In some example embodiments, one or more computer systems (e.g., a stand-alone system, a client and/or server computer system, or a peer-to-peer computer system) or one or more processors may be configured by software (e.g., an application or application portion) as a hardware-implemented module that operates to perform certain operations as described herein.

Accordingly, the term "hardware-implemented module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and/or receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and may store the output of that operation in a memory device to which it is communicatively coupled. A further hardware-implemented module may then, at a later time, access the memory device to retrieve and process the stored output. Hardware-implemented modules may also initiate communications with input or output devices.

FIG. 14 is a block diagram of a machine in the example form of a computer system 300 within which instructions 306 for causing the machine to perform any one or more of the methodologies discussed herein may be executed by one or more hardware processors 302. In various embodiments, computing system 300 is connected (e.g., networked) to a plurality of other computing devices or machines as in P2P network 30. Alternatively, the machine operates as a stand-alone device and defines at least one node 20 on P2P network 30. In a networked deployment, computer system 300 may operate as a peer machine in a peer-to-peer (or distributed) network environment or related environment. In some examples, the machine may be a desktop computer, a laptop computer, a tablet computer, a television receiver or set-top box (STB), a video streaming device, a smart television, a smartphone, a gaming system, a web appliance, a communication network node (e.g., a network router, switch, or bridge), a computing system embedded within another device or system (e.g., a household appliance), or any machine capable of executing instructions 306 (sequential or otherwise) that specify actions to be taken by that machine. Further, while only a single computer system 300 is illustrated, the term "machine" and computer system 300 shall also be taken to include any collection of machines or computer systems 300 that individually or jointly execute a set (or multiple sets) of instructions 306 to perform any one or more of the methodologies discussed herein such as decentralized file distribution and job allocation in a P2P network 30.

As depicted in FIG. 14, the example computing system 300 may include one or more hardware processors 302, one or more data storage devices 304, one or more memory devices 308, and/or one or more input/output devices 310. Each of these components may include one or more integrated circuits (ICs) (including, but not limited to, FPGAs, ASICs, and so on), as well as more discrete components, such as transistors, resistors, capacitors, inductors, transformers, and the like. Various ones of these components may communicate with one another by way of one or more communication buses, point-to-point communication paths, or other communication means not explicitly depicted in FIG. 14. Additionally, other devices or components, such as, for example, various peripheral controllers (e.g., an input/output controller, a memory controller, a data storage device controller, a graphics processing unit (GPU), and so on), a power supply, one or more ventilation fans, and an enclosure for encompassing the various components, may be included in the example computing system 300, but are not explicitly depicted in FIG. 14 or discussed further herein.

The at least one hardware processor 302 may include, for example, a central processing unit (CPU), a microprocessor, a microcontroller, and/or a digital signal processor (DSP). Further, one or more hardware processors 302 may include one or more execution cores capable of executing instructions and performing operations in parallel with each other.

The one or more data storage devices 304 may include any non-volatile data storage device capable of storing the executable instructions 306 and/or other data generated or employed within the example computing system 300. In some examples, the one or more data storage devices 304 may also include an operating system (OS) that manages the various components of the example computing system 300 and through which application programs or other software may be executed. Thus, in some embodiments, the executable instructions 306 may include instructions of both application programs and the operating system. Examples of the data storage devices 304 may include, but are not limited to, magnetic disk drives, optical disk drives, solid state drives (SSDs), flash drives, and so on, and may include either or both removable data storage media (e.g., Compact Disc Read-Only Memory (CD-ROM), Digital Versatile Disc Read-Only Memory (DVD-ROM), magneto-optical disks, flash drives, and so on) and non-removable data storage media (e.g., internal magnetic hard disks, SSDs, and so on).

The one or more memory devices 308 may include, in some examples, both volatile memory (such as, for example, dynamic random access memory (DRAM), static random access memory (SRAM), and so on) and non-volatile memory (e.g., read-only memory (ROM), flash memory, and the like). In one embodiment, a ROM may be utilized to store a basic input/output system (BIOS) to facilitate communication between an operating system and the various components of the example computing system 300. In some examples, DRAM and/or other rewritable memory devices may be employed to store portions of the executable instructions 306, as well as data accessed via the executable instructions 306, at least on a temporary basis. In some examples, one or more of the memory devices 308 may be located within the same integrated circuits as the one or more hardware processors 302 to facilitate more rapid access to the executable instructions 306 and/or data stored therein.

The one or more data storage devices 304 and/or the one or more memory devices 308 may be referred to as one or more machine-readable media, which may include a single medium or multiple media (e.g., a centralized or distributed database, and/or associated caches and servers) that store the one or more executable instructions 306 or data structures. The term "machine-readable medium" shall also be taken to include any tangible medium that is capable of storing, encoding, or carrying instructions 306 for execution by the machine and that cause the machine to perform any one or more of the methodologies of the present invention, or that is capable of storing, encoding, or carrying data structures utilized by or associated with such instructions 306.

The input/output devices 310 may include one or more communication interface devices 312, human input devices 314, human output devices 316, and environment transducer devices 318. The one or more communication interface devices 312 may be configured to transmit and/or receive information between the example computing system 300 and other machines or devices by way of one or more wired or wireless communication networks or connections. The information may include data that is provided as input to, or generated as output from, the example computing device 300, and/or may include at least a portion of the executable instructions 306. Examples of such network or connections may include, but are not limited to, Universal Serial Bus (USB), Ethernet, Wi-Fi®, Bluetooth®, Near Field Communication (NFC), Long-Term Evolution (LTE), and so on. One or more such communication interface devices X10 may be utilized to communicate one or more other machines, either directly over a point-to-point communication path, over a wide area network (WAN) (e.g., the Internet), over a local area network (WAN), over a cellular (e.g., third generation (3G) or fourth generation (4G)) network, or over another communication means. Further, one or more of one of wireless communication interface devices 312, as well as one or more environment transducer devices 318 described below, may employ an antenna for electromagnetic signal transmission and/or reception. In some examples, an antenna may be employed to receive Global Positioning System (GPS) data to facilitate determination of a location of the machine or another device.

In some embodiments, the one or more human input devices 314 may convert a human-generated signal, such as, for example, human voice, physical movement, physical touch or pressure, and the like, into electrical signals as input data for the example computing system 300. The human input devices 314 may include, for example, a keyboard, a mouse, a joystick, a camera, a microphone, a touch-sensitive display screen ("touchscreen"), a positional sensor, an orientation sensor, a gravitational sensor, an inertial sensor, an accelerometer, and/or the like.

The human output devices 316 may convert electrical signals into signals that may be sensed as output by a human, such as sound, light, and/or touch. The human output devices 316 may include, for example, a display monitor or touchscreen, a speaker, a tactile and/or haptic output device, and/or so on.

The one or more environment transducer devices 318 may include a device that converts one form of energy or signal into another, such as from an electrical signal generated within the example computing system 300 to another type of signal, and/or vice-versa. Further, the transducers 318 may be incorporated within the computing system 300, as illustrated in FIG. 14, or may be coupled thereto in a wired or wireless manner. In some embodiments, one or more environment transducer devices 318 may sense characteristics or aspects of an environment local to or remote from the example computing device 300, such as, for example, light, sound, temperature, pressure, magnetic field, electric field, chemical properties, physical movement, orientation, acceleration, gravity, and so on. Further, in some embodiments, one or more environment transducer devices 318 may generate signals to impose some effect on the environment either local to or remote from the example computing device 300, such as, for example, physical movement of some object (e.g., a mechanical actuator), heating or cooling of a substance, adding a chemical substance to a substance, and so on.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the disclosure and are thus within the spirit and scope of the present disclosure. From the above description and drawings, it will be understood by those of ordinary skill in the art that the particular embodiments shown and described are for purposes of illustrations only and are not intended to limit the scope of the present disclosure. References to details of particular embodiments are not intended to limit the scope of the disclosure.

What is claimed is:

1. A system for managing large datasets comprising:
   a physical network comprising a plurality of computing devices and a plurality of processors;
   a peer-to-peer (P2P) network, the P2P network comprising a plurality of nodes and a logical network derived from the physical network; a distributed file system for distributing data and jobs randomly across the plurality of nodes in the P2P network, by:
   receiving a file by an originating data node of the plurality of nodes, with a first processor of the plurality of processors assigned to the originating data node and being configured to: divide the file into a plurality of pages, assign a hash value to a first page of the plurality of pages, and transfer the first page of the plurality of pages to an initial responsible data node, the initial responsible data node including a name defining a string of characters that shares a predetermined number of values with the hash value of the first page of the plurality of pages;
   replicating the first page of the plurality of pages from the initial responsible data node to a first responsible data node and a second responsible data node;
   receiving a job at an originating job node and dividing the job into a plurality of tasks, wherein the job comprises an input file name, a map function to process the plurality of tasks, and a reduce function to generate a set of results for the plurality of tasks from values derived from the map function;
   routing a first task of the plurality of tasks to an initial responsible job node; and
   assigning the first task of the plurality of tasks to a first processing node using the initial responsible job node; and
   a task scheduler for delegating the first task of the plurality of tasks as necessary to optimize load distribution, by:
   assigning the first task of the plurality of tasks to a first queue of at least two queues in the first processing node, and
   forwarding the first task of the plurality of tasks to a second processing node remote from the first processing node,
   wherein each of the plurality of nodes in the P2P network is configured to perform data storage, task execution, and job delegation, and
   wherein a distributed hash table is utilized to form the P2P network, and
   wherein globally unique arbitrary keys are mapped to individual nodes of the plurality of nodes to allow for a node lookup by referencing the unique arbitrary keys to accommodate random distribution of node names within the P2P network.

2. The system of claim 1, wherein the distributed file system and the task scheduler are present on every node of the plurality of nodes and work together to ensure data is replicated and task loads are balanced across the plurality of nodes.

3. The system of claim 1, further comprising:
   providing a remote method invocation framework to facilitate communication between the plurality of nodes.

4. The system of claim 2, wherein the tasks are balanced across the plurality of nodes due to a configuration of the P2P network.

5. The system of claim 1, wherein the initial responsible job node assigns reduce functions to at least one of the plurality of nodes which becomes one or more reduce nodes and the initial responsible job node delegates a plurality of map tasks to at least one of the plurality of nodes which become map nodes; and wherein when all of the plurality of map tasks have been completed, the one or more reduce nodes apply the reduce functions and submit results of the reduce functions to an output file.

6. The system of claim 1, wherein the at least two queues include a local queue for processing the plurality of tasks at the first processing node, and a forwarding queue for delegating the plurality of tasks to the second processing node.

7. The system of claim 1, wherein forwarding the first task to the second processing node is executed upon the task scheduler determining that the second processing node has a reduced load value as compared to the first processing node.

8. The system of claim 1, wherein a number of the plurality of nodes in the system equals a total of processors of the plurality of processors per computing device.

9. A computer program product comprising non-transitory media for managing large dataset and defining instructions, comprising:
   forming a peer-to-peer (P2P) network from a physical network comprising a plurality of computing devices, the P2P network comprising a plurality of nodes and a logical network associated with the plurality of computing devices of the physical network;

generating a distributed file system, configured for:
  receiving incoming files by an origination node of the plurality of nodes,
  dividing the incoming files into a plurality of pages and distributing the pages to the plurality of nodes of the P2P network, by
    transferring a first page of the plurality of pages to an initial responsible data node, the initial responsible data node including a name defining a string of characters that shares a predetermined number of values with a hash value of the first page of the plurality of pages;
  replicating each of the plurality of pages to neighboring nodes;
  assigning at least one task corresponding to the plurality of pages to a first processing node; and
  implementing a task scheduler for delegating the at least one task from the first processing node to a second processing node when a load value of the second processing node is less than a load value of the first processing node,
  wherein the first processing node and second processing node comprise map nodes and reduce nodes to perform map tasks and reduce functions,
  wherein each of the plurality of nodes in the P2P network is adapted to perform data storage, task execution, and job delegation, and
  wherein a distributed hash table is implemented to assign values or names to peers of the P2P network.

10. The computer program product of claim 9, wherein the at least one task is initially delegated to a random one of the plurality of nodes bearing corresponding pages of the at least one task.

11. A method for managing large datasets, comprising:
  forming a peer-to-peer (P2P) network comprising a plurality of nodes, each node of the plurality of nodes associated with at least one processor of a physical network;
  distributing a page of a file to a first data node of the plurality of nodes;
  assigning a hash value to the page;
  transferring the page to an initial responsible data node, the initial responsible data node associated with a name defining a string of characters that shares a predetermined number of values with the hash value of the page;
  replicating the page to at least a second data node of the plurality of nodes;
  receiving a job at an originating job node associated with the P2P network;
  distributing a task of the job to a first processing node;
  determining whether the task should be further distributed to a second processing node; and
  implementing a task scheduler for delegating the task as necessary to optimize load distribution, by:
    assigning the task to a first queue of at least two queues in the first processing node, and
    forwarding the task to a second processing node remote from the first processing node,
    wherein the first processing node and second processing node comprise map nodes and reduce nodes to perform map tasks and reduce functions,
  wherein each of the plurality of nodes in the P2P network is operable to perform data storage, task execution, and job delegation,
  wherein a distributed hash table is utilized to form the P2P network, and
  wherein globally unique arbitrary keys are mapped to individual nodes of the plurality of nodes to allow for a node lookup by referencing the unique arbitrary keys to accommodate random distribution of node names within the P2P network.

12. The method of claim 11, further comprising: replicating the page to a third data node of the plurality of nodes.

13. The method of claim 11, further comprising: establishing a communication link between the first data node and second data node using a remote procedure call.

14. The method of claim 11, wherein the plurality of nodes represent one or more physical computing devices.

15. The method of claim 11, wherein the first data node and second data node monitor each other to determine loss or corruption of the page on either the first data node or second data node.

16. The method of claim 11, wherein the page of the file is named with a file name concatenated with an integral index of the page such that the page can be found by iterating over indices of the page and requesting each in turn.

* * * * *